United States Patent
Natroshvili et al.

(10) Patent No.: US 10,621,753 B2
(45) Date of Patent: Apr. 14, 2020

(54) EXTRINSIC CALIBRATION OF CAMERA SYSTEMS

(71) Applicant: Intel IP Corporation, Santa Clara, CA (US)

(72) Inventors: Koba Natroshvili, Wadlbronn (DE); Kay-Ulrich Scholl, Malsch (DE)

(73) Assignee: Intel IP Corporation, Santa Clara, CA (US)

( * ) Notice: Subject to any disclaimer, the term of this patent is extended or adjusted under 35 U.S.C. 154(b) by 32 days.

(21) Appl. No.: 15/721,098

(22) Filed: Sep. 29, 2017

(65) Prior Publication Data

US 2019/0102911 A1  Apr. 4, 2019

(51) Int. Cl.
*G06T 7/00* (2017.01)
*G06T 7/80* (2017.01)
(Continued)

(52) U.S. Cl.
CPC ............... *G06T 7/85* (2017.01); *B60R 1/00* (2013.01); *G06T 7/73* (2017.01); *G06T 7/80* (2017.01);
(Continued)

(58) Field of Classification Search
None
See application file for complete search history.

(56) References Cited

U.S. PATENT DOCUMENTS

| | | |
|---|---|---|
| 2011/0216194 A1 | 9/2011 | Kosaki |
| 2015/0341629 A1* | 11/2015 | Zeng .................. G06T 7/80 348/187 |

(Continued)

FOREIGN PATENT DOCUMENTS

| | | | |
|---|---|---|---|
| EP | 2375376 A1 * | 10/2011 | ........... F01D 21/003 |
| WO | 2019067298 | 4/2019 | |

OTHER PUBLICATIONS

Lowe, David G, et al., "Object recognition from local scale-invariant features", The Proceedings of the Seventh IEEE International Conference on Computer Vision, 1999, vol. 2, Retrieved at <http://Iwww.cs.ubc.ca/lowe/papers/iccv99.pdf>, (1999), 1150-1157.

(Continued)

*Primary Examiner* — Delomia L Gilliard
(74) *Attorney, Agent, or Firm* — Schwegman Lundberg & Woessner, P.A.

(57) ABSTRACT

An extrinsic camera calibration system (ECCS) comprising a surround view system (SVS) interface connecting the ECCS to the SVS. The SVS comprises four cameras mounted to front, back, left, and right sides of a vehicle respectively that are front, back, left, and right cameras, as well as an imaging interface at which images from the four cameras are output. A calibration pattern that comprises a set of features is used by an extrinsic calibration processor. A network interface is connected to the four cameras via the imaging interface. The processor receives, from each camera, an image comprising captured features from the calibration pattern. It determines and stores extrinsic calibration parameters (ECPs) for each camera that map coordinates of the features to camera coordinates and that are usable for subsequent normal operation of the cameras, the ECPs being determined from the image features.

25 Claims, 14 Drawing Sheets

(51) Int. Cl.
    *G06T 7/73* (2017.01)
    *B60R 1/00* (2006.01)
    *G06T 15/20* (2011.01)

(52) U.S. Cl.
    CPC ... *B60R 2300/105* (2013.01); *B60R 2300/303* (2013.01); *B60R 2300/402* (2013.01); *B60R 2300/806* (2013.01); *G06T 15/205* (2013.01); *G06T 2207/10016* (2013.01); *G06T 2207/10028* (2013.01); *G06T 2207/20221* (2013.01); *G06T 2207/30208* (2013.01); *G06T 2207/30232* (2013.01); *G06T 2207/30248* (2013.01); *G06T 2207/30252* (2013.01)

(56) References Cited

U.S. PATENT DOCUMENTS

| | | | |
|---|---|---|---|
| 2016/0210750 A1* | 7/2016 | Singh | G06T 7/80 |
| 2016/0284087 A1 | 9/2016 | Natroshvili et al. | |
| 2017/0054974 A1 | 2/2017 | Pliefke | |
| 2017/0134722 A1 | 5/2017 | Okouneva | |
| 2017/0221226 A1 | 8/2017 | Shen et al. | |
| 2017/0287166 A1* | 10/2017 | Claveau | G06T 7/80 |
| 2018/0040141 A1* | 2/2018 | Guerreiro | G06T 7/80 |
| 2018/0322657 A1* | 11/2018 | Dubout | G06K 9/4604 |

OTHER PUBLICATIONS

Scaramuzza, D, et al., "A Flexible Technique for accurate omnidirectinal camera calibration and structure from motion", Computer Vision Systems ICVS 06, (2006), 8 pgs.

Shizima, S, "Wraparound view system for Motor Vehicles", Fujitsu Sci. Tech. J. vol. 46, (Jan. 2010), 95-102.

"International Application Serial No. PCT US2018 051930, International Search Report dated Apr. 1, 2019", 3 pgs.

"International Application Serial No. PCT US2018 051930, Written Opinion dated Apr. 1, 2019", 10 pgs.

* cited by examiner

EXTRINSIC CALIBRATION OF CAMERA SYSTEMS

TECHNICAL FIELD

Embodiments described herein generally relate to an extrinsic calibration camera system (ECCS), for example, for a Surround View System (SVS).

BACKGROUND

At least one of cameras or sensors may be used for advanced driver assistance systems that assist vehicle drivers with certain driving functions, such as pulling the vehicle into a tight parking space, and automated driving systems that allow a vehicle to drive without human intervention. An SVS may be utilized with the camera/sensor configurations in the advanced driver assistance systems and the automated driving systems. An SVS may comprise several cameras installed on a vehicle perimeter, and in certain conditions may replace the vehicle's outside mirrors, creating a bird's eye view of the ground plane, giving the driver full visibility around the vehicle in various scenarios such as parking.

The relative orientation of the cameras is important. If the extrinsic parameters for camera calibration are not calculated precisely, the driver may get a false perception of the vehicle's surroundings. Cameras are typically calibrated by bringing the vehicle into an environment with fixed markings where the position of the markings are known beforehand. However, using this method, to achieve proper extrinsic calibration, the vehicle is brought to a specific position with a very high accuracy, and such high accuracy positioning of the vehicle may be challenging.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
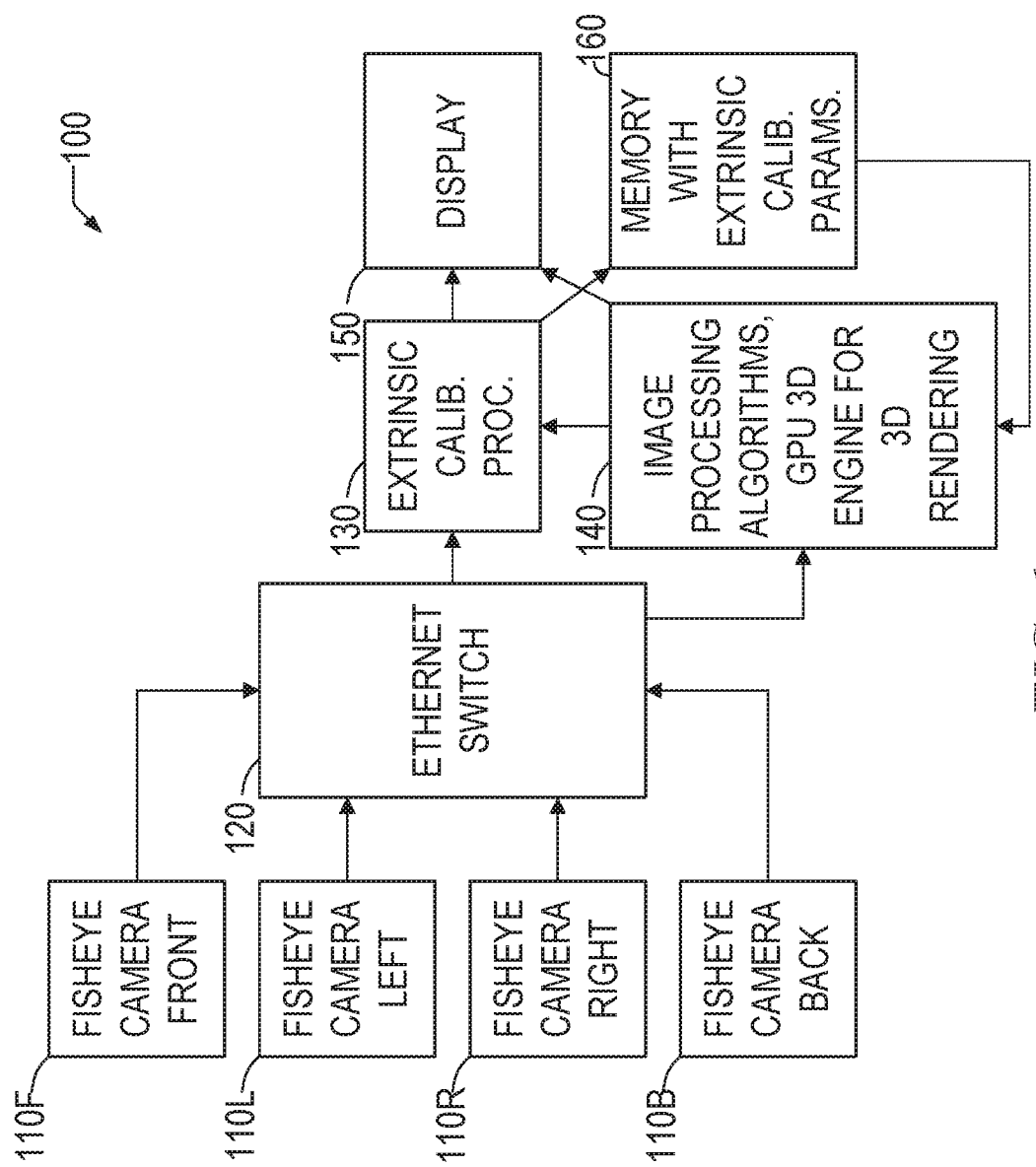
FIG. 1 is a block diagram showing the components, according to an example implementation of an SVS.

In the following description, for purposes of explanation, numerous specific details are set forth in order to provide a thorough understanding of some example embodiments. It will be evident, however, to one skilled in the art that the present disclosure may be practiced without these specific details.

Various approaches for an extrinsic calibration of camera systems are described below. These approaches may use a calibration pattern, which provides a pattern that may or may not repeat pattern units and has known dimensions for the pattern units. In an example, a first approach uses a single calibration pattern placed step-by-step on a vehicle perimeter. A second approach uses several calibration patterns placed on the ground plane. The vehicle drives between the calibration setup patterns. No knowledge of the vehicle's location relative to the calibration patterns is necessary-only distances between the calibration patterns are required. A third approach gives the most flexibility in calibration. Various features are distributed on the ground plane arbitrarily. The vehicle drives forward and backward, and all extrinsic calibration parameters are automatically estimated. As defined herein, the term "vehicle" is to be construed broadly and encompasses any object movable with respect to a ground reference system.

Each of these approaches provides improved calibration results, to assist the correct operation of the SVS. In each of these approaches, the relative orientation and positions of the cameras are important. As noted above, if the extrinsic parameters are not calculated precisely, the driver may get a false perception of the vehicle's surroundings and collide with objects within the environment. Although these approaches are described below for an SVS by way of example, they are applicable to similar systems with camera sets and are not limited to an SVS. Also, the cameras utilized herein may be fish-eye or wide angle cameras that enable catching a wide-angle view of the surrounding scenery, however, the invention is not limited thereto, and any type of camera and lens system may be utilized.

As discussed herein, extrinsic calibration addresses how the cameras are oriented (position and rotation) with respect to a vehicle and with respect to each other, and the extrinsic calibration parameters may include both translation and rotation matrices. Such techniques for extrinsic calibration are distinguished from intrinsic calibration, with extrinsic calibration generally referring to how a 3D point in front of a camera maps to a particular pixel on the camera's image sensor. The intrinsic calibration does not depend on the positioning of the camera and does not change during operation of the vehicle. The disclosure herein focuses on extrinsic calibration techniques. Typically, intrinsic and extrinsic calibrations are done separately. Intrinsic calibration projects object from the camera coordinates into the image coordinates, and the intrinsic calibration does not depend on the camera orientation. It may be calibrated once for a given fixed lens, and for the fixed lens cases, the intrinsic parameters stay constant. After the calibration parameters are determined from the calibration process, the SVS may return to normal operation, defined as operation in which images are received from the camera, processed using the calibration parameters, and displayed on a display device.

FIG. 1 is a block diagram that illustrates an example implementation of an SVS 100 that comprises four fisheye cameras 110 (use of a reference number without an associated letter suffix may refer to the elements collectively, or may refer to a single example element) located on the vehicle perimeter: in front (front camera 110F), under the left (left camera 110L) and right (right camera 110R) mirrors, and on the back side (back or rear camera 110B). Each camera 110 may provide nearly a 180° field of view. Together, the cameras may provide 360° visibility around the vehicle.

The cameras 110 may be connected to a network, and such a network may be wired or wireless. Known networking technologies capable of handling video bandwidths may be used to interconnect the cameras with the other components of the system 100. Video frames from the four cameras 110 may be transferred over the network through a network component, such as an Ethernet switch 120 to an extrinsic calibration processor 130. The processor 130 may utilize image processing algorithms and a graphics processing unit (GPU) 3D engine for 3D rendering 140. The processed output may be provided in a display 150 for viewing by a user.

Figure 2A:
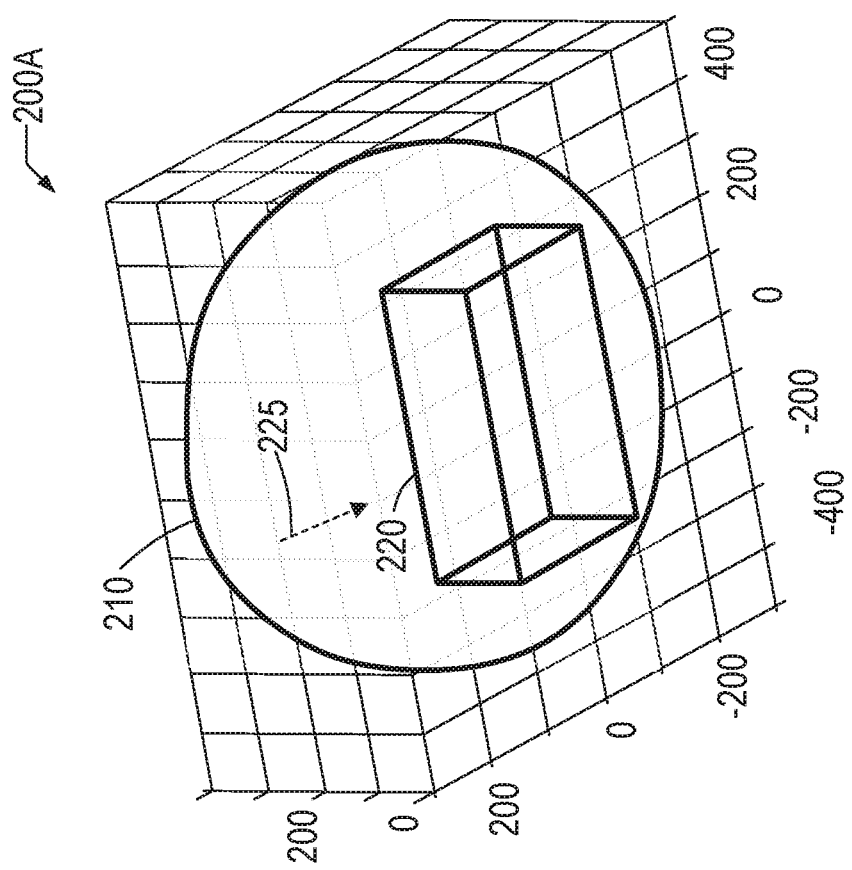
FIG. 2A is a pictorial representations of image projections based on camera inputs, according to an example implementation.

FIG. 2A is a pictorial representations of an image projections 200A based on camera inputs. Four images from the four cameras 110 are projected onto a virtual bowl 210 surrounding the vehicle. The bowl 210 may have a shape as shown in FIG. 2A, which is a line drawing having a 3D coordinate grid displayed. A prism 220 is formed of voxels that represent dimensions of the vehicle. A user (e.g., a vehicle driver) may be able to monitor the 360° surrounding of the vehicle on the vehicle display, such as the display 150.

An example display output may simulate a virtual camera and may be created from stitched-together images of the fisheye cameras 110 created by an image stitcher. The vehicle driver may be able to virtually place the virtual camera (i.e., provide a vantage point or view direction 225 from an arbitrary location in space) at any convenient position within the proximity of the vehicle to see the surroundings from different angles using a view controller (not shown), such as a joystick, touch screen, voice command, selection from predefined relative locations, and the like, to move the viewing position and direction (i.e., a vantage point) about in 3D space, which causes the image stitcher to restitch the images from the moved vantage point. The 3D image may be rendered using the system's GPU 140.

Multi-camera systems may be used for different applications, but for all applications, knowledge of the intrinsic and extrinsic calibration parameters is important. For example, in a use case of generating a stitched image on the ground plane, a mapping is established between every point from the ground plane to the particular image (e.g., a fish eye camera image). In this use case, a 3D point from the ground plane is mapped to the camera coordinates by using the extrinsic parameters. After the 3D points in the camera coordinates are determined, the intrinsic parameters may be used to project into the image plane.

The extrinsic calibration processor 130, once it has performed the extrinsic calibration, may put related parameters in a memory 160 that contains the extrinsic (along with the intrinsic) calibration parameters. The memory 160 may thus contain these parameters comprising rotation matrices (orientation, with three degrees of freedom) and translation (position, with three degrees of freedom) for each of the cameras. These parameters relate camera positions and angles to the vehicle and to elements in the WCS. When not undergoing extrinsic calibration, this memory 160 may be accessed by the image processing algorithms 140 for use in processing the images from the cameras 110 and for subsequent display in normal operation of the SVS.

Orientation of the Camera to the Calibration Pattern

Figure 2B:
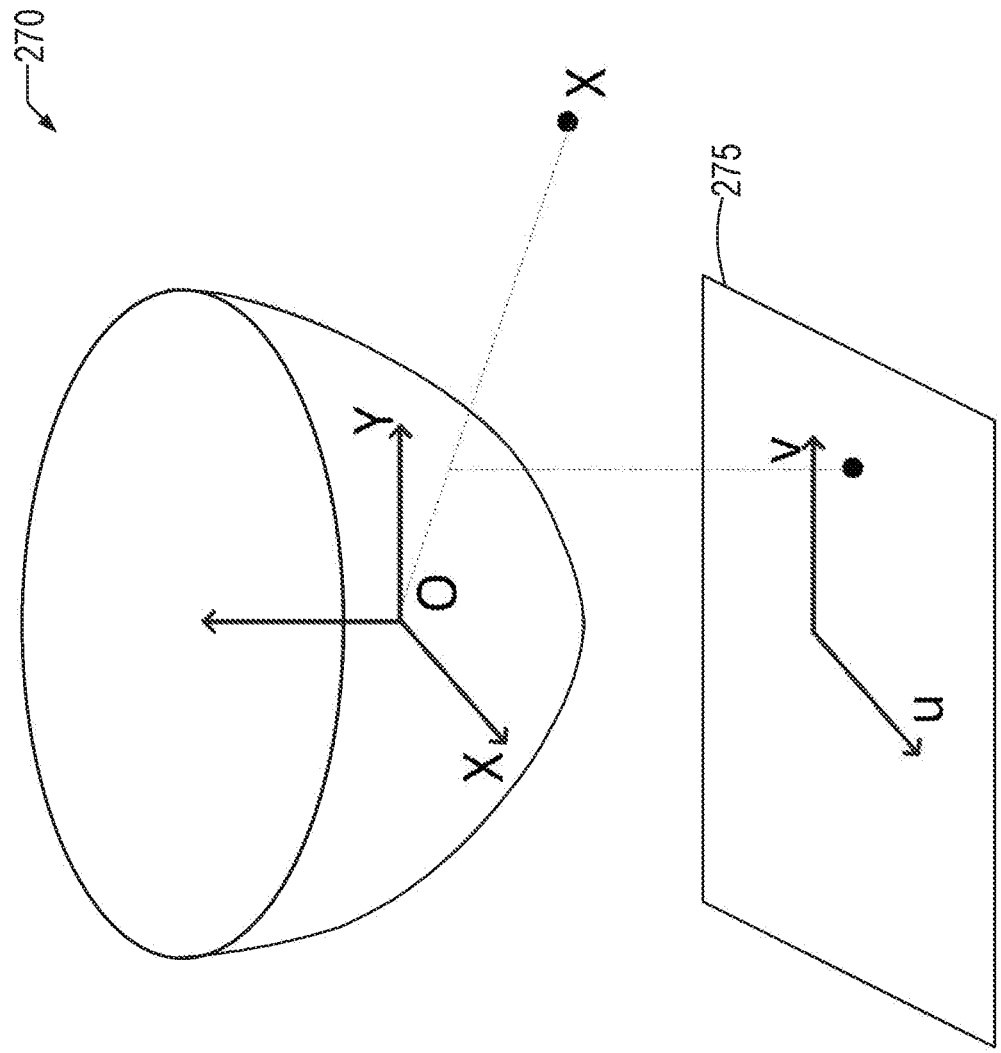
FIG. 2B is a pictorial image illustrating a modeling of an example omnidirectional camera.

In an example, different fisheye projection models are available to use in the SVS 100, when fisheye lenses are used in the cameras, in order to establish the orientation of the camera to a calibration pattern. In addition to fisheye distortion of the fisheye lenses, other types of distortions may have been introduced in the manufacturing process. To account for these distortions, intrinsic parameters for fisheye cameras may be generally calibrated using polynomial approximation. In the different approaches, an algorithm may be derived for estimation of extrinsic parameters of a camera to pattern features. In the present fisheye or wide angle camera application, special modeling may be provided using the polynomial approximation. If the system utilizes normal perspective cameras, then the algorithm of the pattern feature to camera orientation would be different, but the remaining determinations are the same. For an omnidirectional camera, a known Scaramuzza, Martinelli, Seigwart model may be used FIG. 2B is a pictorial image illustrating a projection modeling 270 of an omnidirectional camera, as may be used for determining the orientation of the camera to the calibration pattern. A 3D point X (which is representative of any of the points in the calibration pattern) is projected on a plane (u, v) 275 representing the camera image plane. On, this projection, the following relationship (equation (1)) is valid:

$$P \cdot X = \lambda \begin{bmatrix} (Au + T) \\ f(u, v) \end{bmatrix} \quad (1)$$

where:
P is a perspective projection matrix;
X is the 3D point in space;
u is a projection into the fisheye image (u,v);
$\lambda$ is a factor corresponding to the homogenous ambiguity, which is an unknown factor related to the mapping of 3D points from a line being projected to a common 2D point; and
A, T are factors corresponding to misalignment in the image plane, where A is a matrix and T is a translation vector—these factors relate to the fact that the image center is not necessarily in the coordinate center and that the image may have different resolutions in horizontal and vertical directions.

Detecting the intrinsic parameters means finding A, T and function f(u,v) which is approximated by the polynomial approximation given in equation (2) below.

$$f(u,v) = a_0 + a_1\rho + a_2\rho^2 + \ldots + a_n\rho^n \quad (2)$$

where:

ρ is the metric distance of point (u, v) to the optical axis.

Without losing generality, the Z coordinate of the pattern in its own coordinate system is assumed to be zero. Equation 3 below provides the first two elements $t_1$, $t_2$ of the translation vector T (comprising components $t_1$, $t_2$, and $t_3$), and a part of a rotation matrix. This is to determine the location and rotation of the camera relative to the pattern, or specifically, points on the pattern.

$$\lambda \begin{bmatrix} u \\ v \\ f(u,v) \end{bmatrix} = P \cdot X = [r_1, r_2, r_3, T] \cdot \begin{bmatrix} X \\ Y \\ 0 \\ 1 \end{bmatrix} = [r_1, r_2, T] \cdot \begin{bmatrix} X \\ Y \\ 1 \end{bmatrix} \quad (3)$$

where $r_1$, $r_2$, $r_3$ are the columns of the rotation matrix. Equations for all points located on the calibration pattern $X_1$, $X_2$, ... $X_n$ are determined, and a linear matrix equation is obtained. It is over determined and is solved by the singular value decomposition (SVD) method, which is a factorization of a matrix.

Generally, the rotation matrix has the property that all columns and rows are orthonormal. These factors allow an estimation of the full rotation matrix, leaving the only remaining unknown, which is the depth of the calibration pattern to the camera (the third part of the translation vector T, which is t3). The estimation of the third part t3 of the translation vector T may be done in a known manner similar to that described by K. Natroshvili and B. Gassmann.

The equation (3) is valid for all points which are on the calibration pattern. Therefore, some reordering yields in equation (4):

$$\begin{bmatrix} A_1, A_1\rho_1, \ldots, A_1\rho_1^m \\ C_1, C_1\rho_1, \ldots, C_1\rho_1^m \\ A_2, A_2\rho_2, \ldots, A_2\rho_2^m \\ C_2, C_2\rho_2, \ldots, C_2\rho_2^m \\ \ldots \\ A_n, A_n\rho_n, \ldots, A_n\rho_1^m \\ C_n, C_n\rho_n, \ldots, C_n\rho_1^m \end{bmatrix} \cdot \begin{bmatrix} a_0 \\ a_1 \\ \ldots \\ a_m \end{bmatrix} - \begin{bmatrix} B1 \\ D1 \\ B2 \\ D2 \\ \ldots \\ Bn \\ Dn \end{bmatrix} = \begin{bmatrix} v_1 \\ u_1 \\ v_2 \\ u_2 \\ \ldots \\ v_n \\ u_n \end{bmatrix} \cdot t_3 \quad (4)$$

In the above following notations (5) are used:

$A_i = r_{21}(i) \cdot X(i) + r_{22}(i) Y(i) + t_2(i)$ $B_i = v(i) \cdot r_{31}(i) * X(i) + r_{32}(i) Y(i))$ $C_i = r_{11}(i) \cdot X(i) + r_{12}(i) Y(i) + t_1(i)$ $D_i = u(i) \cdot (r_{31}(i) \cdot X(i) + r_{32}(i) X(i))$ \quad (5)

where A, B, C, and D are intermediate variables and I is the index of a particular point.

Finally, the third part t3 of the translation vector t may be calculated according to equation (6) as:

$$t_3 = \begin{bmatrix} v_1 \\ u_1 \\ v_2 \\ u_2 \\ \ldots \\ v_n \\ u_n \end{bmatrix}^{-1} \left( \begin{bmatrix} A_1, A_1\rho_1, \ldots, A_1\rho_1^m \\ C_1, C_1\rho_1, \ldots, C_1\rho_1^m \\ A_2, A_2\rho_2, \ldots, A_2\rho_2^m \\ C_2, C_2\rho_2, \ldots, C_2\rho_2^m \\ \ldots \\ A_n, A_n\rho_n, \ldots, A_n\rho_1^m \\ C_n, C_n\rho_n, \ldots, C_n\rho_1^m \end{bmatrix} \cdot \begin{bmatrix} a_0 \\ a_1 \\ \ldots \\ a_m \end{bmatrix} - \begin{bmatrix} B1 \\ D1 \\ B2 \\ D2 \\ \ldots \\ Bn \\ Dn \end{bmatrix} \right) \quad (6)$$

SVS Extrinsic Calibration: Single-Pattern Approach

Figure 3A:
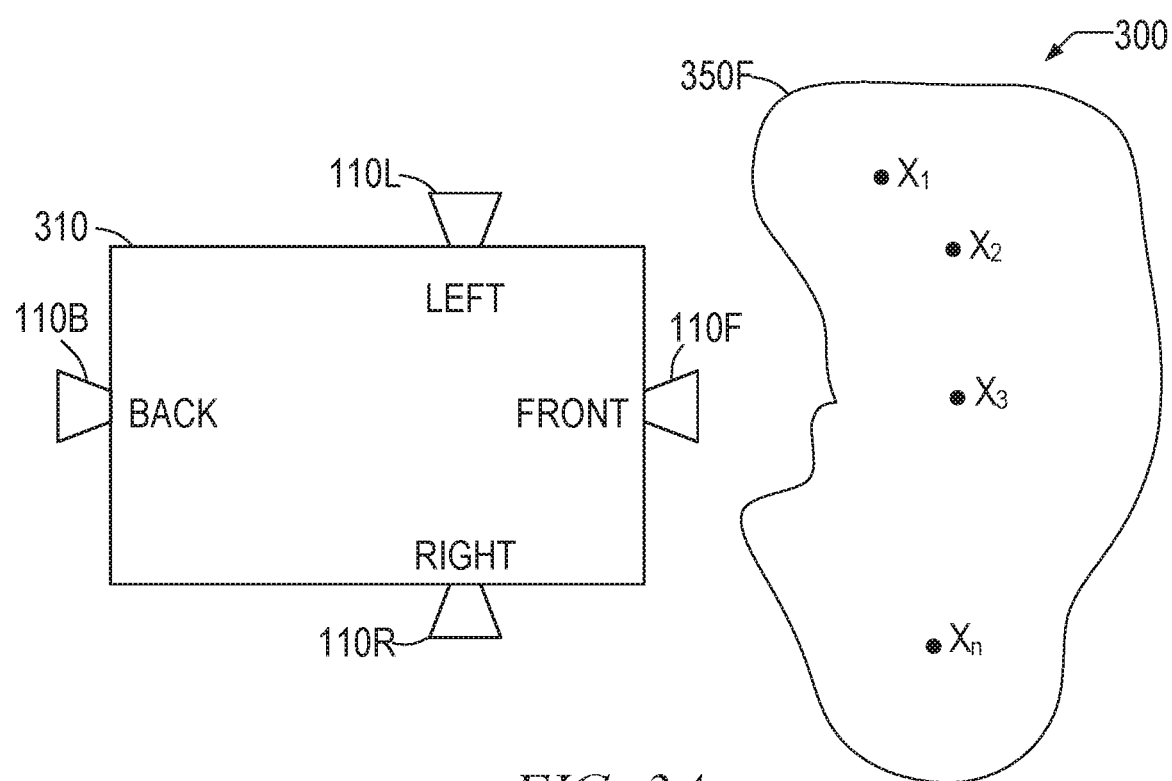
FIG. 3A is a pictorial diagram illustrating an example scenario using a Single-pattern Approach.

FIG. 3A is a pictorial diagram illustrating an example scenario 300 using the Single-pattern Approach and having a calibration pattern 350F of known dimensions and n markers $X_1$-$X_n$, whose relative locations are known initially, placed at the front of a vehicle 310. In the Single-pattern Approach, a single flat calibration pattern 350F is used. The size of the pattern may vary, but the calibration pattern 350F should be fully visible to each camera 110. Larger patterns 350F may improve the precision of feature detection to the image and allow more features $X_1$-$X_n$ to be allocated. However, a larger pattern 350F may be inconvenient for the user to carry around and/or store, and it may involve higher costs to produce. The distance of the pattern 350F to the vehicle 310 is initially determined. It may be determined either by a precise measurement, or, if the pattern contains special markings/features $X_1$-$X_n$ with known locations relative to each other, the distance can be determined by imaging the special markings and calculating this distance.

The illustrated vehicle 310 has four cameras 110 mounted on it. In one implementation, the calibration pattern 350F may be initially placed on the ground in front of the vehicle 310 for the front camera 110F and imaged, and then is subsequently and sequentially moved and rotated so that each of the cameras will have a same view of the calibration pattern 350F. The calibration pattern 350F may be then placed on the ground adjacent to the right 110R, left 110L, and back 110B cameras (order is not important) and sequentially imaged respectively. Although a checkerboard pattern is one type of pattern that may be used, other patterns, such as triangles, circles, etc. may be utilized as well. The calibration pattern 350F may have special markings $X_1$ to $X_n$ or these may be particular defined features (i.e., fifth checker pattern from the right and second from the front). The indicated markings $X_1$-$X_n$ may be adjusted to the dimensions of the particular vehicle 310 and provide the possibility to orient the patterns 350F relative to the vehicle and to each other.

Figure 3B:
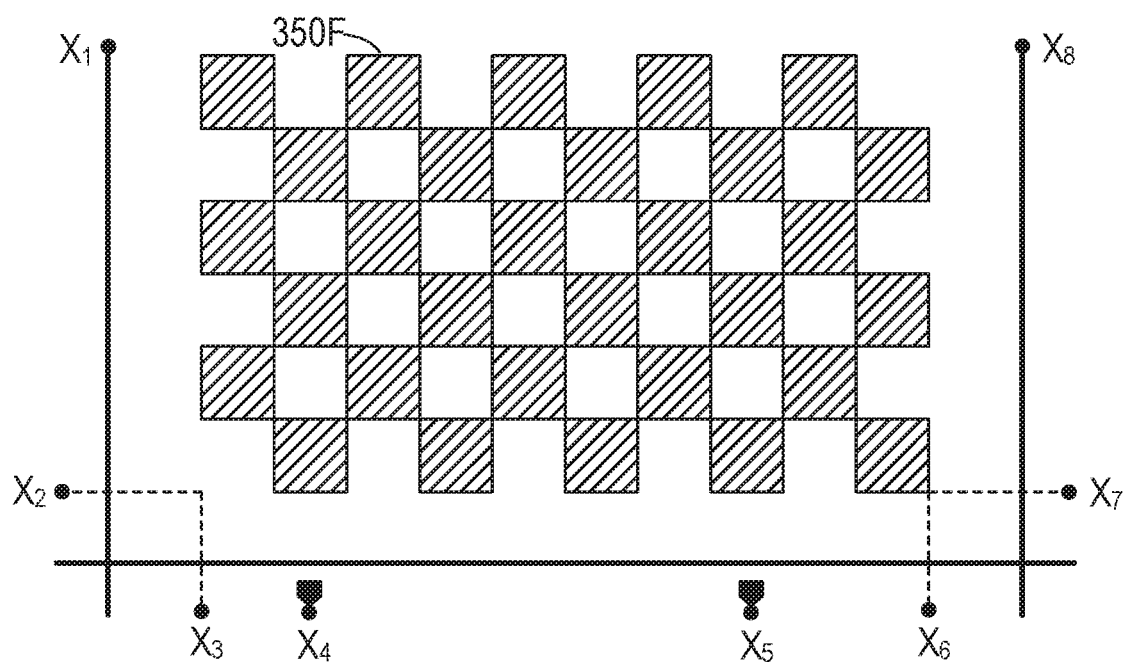
FIG. 3B is a pictorial diagram of an example checkerboard pattern with markings.

FIG. 3B is a pictorial diagram of an example checkerboard pattern 350F with markings $X_1$-$X_8$. The markings $X_2$, $X_3$, $X_6$, and $X_7$ are related to features of the pattern 350F, namely, the closest corners. The remaining markings $X_1$, $X_4$, $X_5$, and $X_8$ may be provided and are based on various locations with respect to the pattern 350F.

The exact locations of the calibration pattern 350F relative to the vehicle 310 may be obtained by either physically measuring the location (which may be cumbersome) or by knowing the pattern 350F size and relative marking locations (by using the markings $X_1$-$X_n$). At each location for the calibration pattern 350 (front, left, right, back), an image acquisition is performed with the corresponding camera (110F, 110L, 110R, and 110B, respectively). In the SVS 100, fisheye cameras 110 may be used because of their wide opening angles.

Intrinsic calibration of each of the fisheye cameras 110 is known in advance, and it is assumed that the intrinsic calibration parameters stay constant during the extrinsic calibration process, which is a valid assumption when using fixed optics. Features $X_1$-$X_n$ on the calibration pattern 350F may then be detected. The type of features $X_1$-$X_n$ detected and subsequently used for the calibration can vary: corners, scaling, and rotation invariant features using techniques such as lines and: (a) David G. Lowe's Scale Invariant Feature Transform (SIFT), an approach that transforms an image into a large collection of local feature vectors, each of which is invariant to image translation, scaling, and rotation, and partially invariant to illumination changes and affine or 3D projection; (b) Bay, Tuytelaars, and Van Gool's Speeded Up Robust Features (SURF), an approach that relies on integral images for image convolutions; by building on the strengths of the leading existing detectors and descriptors (in casu, using a Hessian matrix-based measure for the detector, and a distribution-based descriptor); and by simplifying these methods; and (c) Leutenegger, Chli, and Siegwart's Binary Robust Invariant Scalable Keypoints (BRISK), and approach that applies a novel scale-space detector in combination with the assembly of a bit-string descriptor from intensity comparisons retrieved by dedicated sampling of each keypoint neighborhood may all be used. As an example use case, for a checkerboard pattern, corners are used in the discussion below (although for other shaped patterns, such as triangles or circles, the features may be different).

FIG. 3A illustrates points $X_1$ through $X_n$ on the calibration pattern 350F. According to the algorithm discussed below, which may be executed by coded instructions on the extrinsic calibration processor 130, it may be possible to get the relative orientation of each calibration pattern 350F to the particular camera 110, given as the following projection matrices P that map the calibration pattern 350F coordinates, in its different positions, to particular camera coordinates:

$$P_{CamFront\_PatternFront}, P_{CamRight\_PatternRight},$$

$$P_{CamBack\_PatternBack}, P_{CamLeft\_PatternLeft}$$

The location of the calibration patterns 350F to the vehicle 310 may be known prior to the calibration and may be given with the projection matrices P that map the vehicle coordinates to the calibration pattern coordinates:

$$P_{Vehicle\_PatternFront}, P_{Vehicle\_PatternRight}$$

$$P_{Vehicle\_PatternBack}, P_{Vehicle\_PatternLeft}$$

With this information, each camera's 110 extrinsic position relative to the vehicle 310 may be obtained with the equations (7), where CamFront_PatternFront means a projection matrix from the PatternFront coordinate system to the Camera Front coordinate system, and the inverse projection matrix changes the direction of the projection (which is the nature of homogenous projection matrices):

$$P_{Vehicle\_CameraFront} = P_{Vehicle\_PatternFront} * P^{-1}_{CamFront\_PatternFront}$$

$$P_{Vehicle\_CameraRight} = P_{Vehicle\_PatternRight} * P^{-1}_{CamFront\_PatternRight}$$

$$P_{Vehicle\_CameraBack} = P_{Vehicle\_PatternBack} * P^{-1}_{CamFront\_PatternBack}$$

$$P_{Vehicle\_CameraLeft} = P_{Vehicle\_PatternLeft} * P^{-1}_{CamFront\_PatternLeft} \quad (7)$$

The results obtained may be optimized by the non-linear optimization method, such as the Levenberg-Marquardt algorithm discussed below. The optimized projection matrices $P_{opt\_of\_Vehicle\_Camera}$ may be stored as the calibration parameters in the memory 160 for subsequent post-calibration operational use.

SVS Extrinsic Calibration: Four-Pattern Approach

Figure 4A:
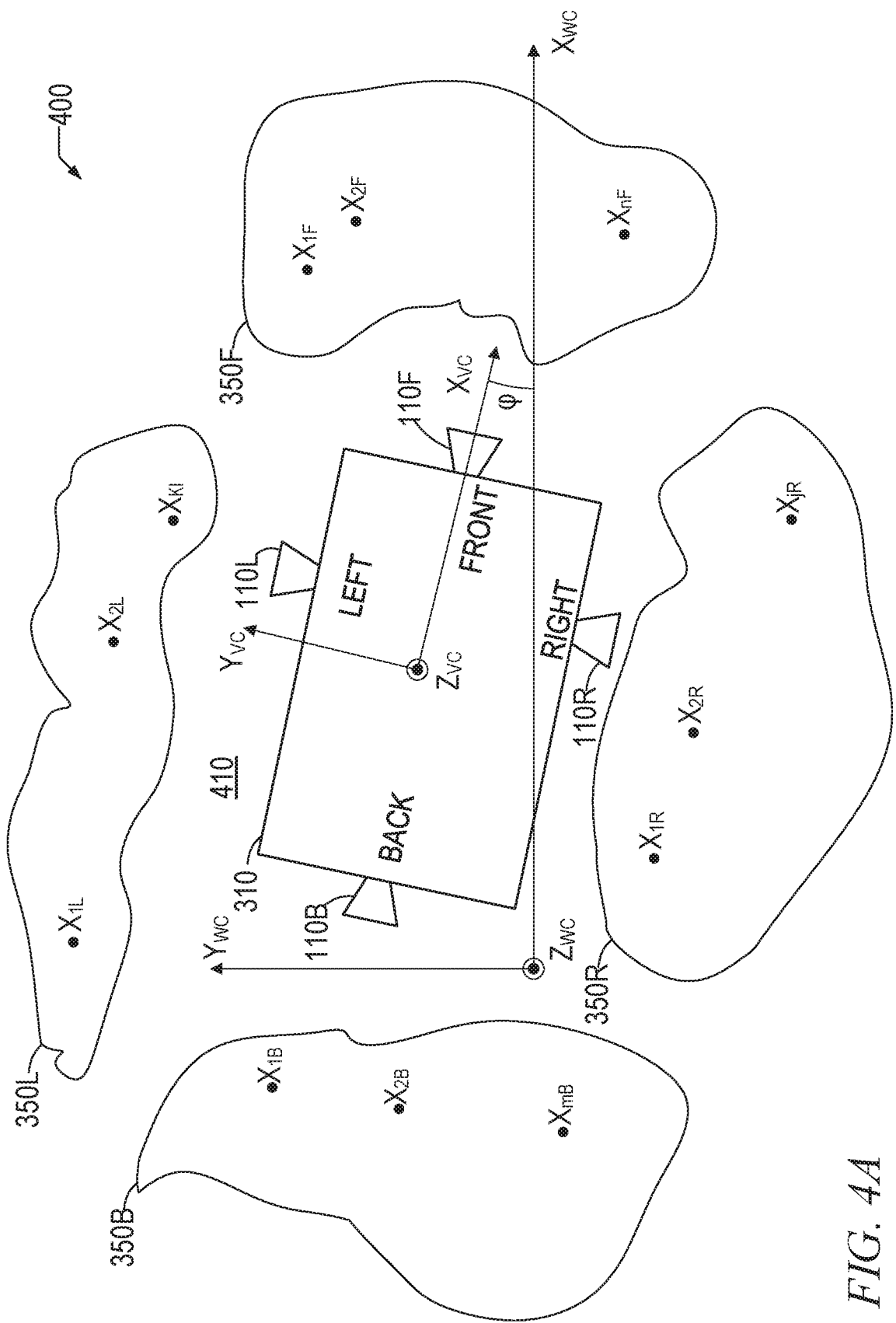
FIG. 4A is a pictorial diagram that illustrates an example vehicle, cameras, and calibration constellation along with the World Coordinate System (WCS) and Vehicle Coordinate System (VCS)/Camera Coordinate System (CCS), according to an implementation.

FIG. 4A, is a pictorial diagram that illustrates a layout 400 for using the Four-pattern Approach. It includes the vehicle 310, cameras 110, and calibration constellation 350 along with a World Coordinate System (WCS) and Vehicle Coordinate System (VCS). The VCS may be related to a Camera Coordinate System (CCS) since the cameras are presumed to be rigidly mounted on the vehicle.

In the Four-pattern Approach, extrinsic parameters may be obtained by laying multiple calibration targets 350F, 350L, 350B, 350R into (collectively) a calibration pattern constellation 350 having a generally rectangular space 410 within them, and then driving the vehicle 310 into the rectangular space 410 and observing features X on the ground plane. The features X here may be distributed in an arbitrary manner. In contrast to the Single-pattern Approach, no fixed setup of calibration patterns 350 is required. Sets of calibration markings X are distributed around the vehicle in the patterns 350. The location of the vehicle 310 relative to the set of markings X is not known. In the Four-pattern Approach, the exact positioning of features X relative to the vehicle 310 is no longer required, however, the feature X locations relative to each other should be known. The calibration markings X can be distributed arbitrarily on the ground plane, and the distances between sets of markings X may be obtained by direct measurements.

It is not necessary that all cameras 110 see the patterns 350 simultaneously. However, the patterns 350 should be visible by two adjacent the cameras (110F, 110L; 110B, 110R; or any other combination of adjacent cameras 110) at any particular instant. When a set of markings X are visible to two of the cameras 110, the orientation of the two cameras 110 may be estimated for that particular instant. For example, the front camera 110F and the right camera 110R should both be able to see the features $X_R$ of the right calibration pattern 350R simultaneously. By allowing two of the cameras 110 to see a common set of patterns 110 simultaneously, it is not necessary for the feature locations X relative to the vehicle 310 to be known prior to calibration. All acquisitions may be eventually processed by an optimization step, producing the extrinsic calibration parameters.

Figure 4B:
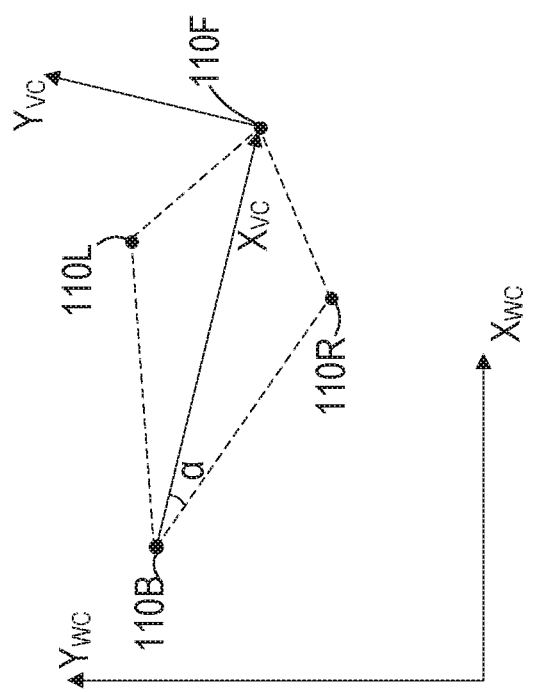
FIG. 4B is a pictorial diagram that illustrates an example of the WCS and VCS.

The calibration constellation 350 is shown in FIG. 4A. FIG. 4B is a pictorial diagram that more clearly illustrates the WCS and VCS.

The vehicle 310 moves between the markings X on the ground plane and acquires data from all of the cameras 110. At first, the features X may be detected on the calibration pattern 350 in the images. With these features X, the orientation of the calibration pattern 350 relative to the camera may be obtained by the algorithm, which may be executed by coded instructions on the extrinsic calibration processor 130, given in equations (1)-(6) above that provide a relative orientation of the calibration (marker set) to the camera. The projection matrixes P may be calculated from the pattern to map pattern coordinates to camera coordinates for a particular time instant t:

$$P_{CamFront\_PatternFront}(t), P_{CamRight\_PatternRight}(t)$$

$$P_{CamBack\_PatternBack}(t), P_{CamLeft\_PatternLeft}(t)$$

Motion (rotation and translation together) of the vehicle relative to the WCS (given by the pattern constellation) may not be known, but it can be modelled by three parameters. The vehicle is assumed to be driving on a flat surface, and therefore, only two coordinates (x, y) of the vehicle relative to the world need to be considered (with z=0). Rotation due to motion of the vehicle happens only around the axis which is normal to the ground plane, and therefore, the rotation matrix can be specified by a single angle φ. Finally, the projection matrix P vehicle coordinates to the WCS is given as:

$$P_{World\_Vehicle}(t) = \begin{bmatrix} \cos\varphi & -\sin\varphi & 0 & t_x \\ \sin\varphi & \cos\varphi & 0 & t_y \\ 0 & 0 & 1 & 0 \\ 0 & 0 & 0 & 1 \end{bmatrix} \quad (8)$$

where

φ is the rotation angle between the vehicle and WCS as shown in FIG. 4A; and $t_x$, $t_y$ is the vehicle translation on the ground plane (based on the assumption that $t_z$=0)

With this information (for each captured image) the projection matrix P (relating the particular pattern to the appropriate camera coordinate system) may be obtained as:

$$P_{CamFront\_PatternFront}(t) = (P^{-1}_{World\_PatternFront} \cdot P_{World\_Vehicle}(t) \cdot P_{Vehicle\_CamFront}(t))^{-1}$$

$$P_{CamRight\_PatternRight}(t) = (P^{-1}_{World\_PatternRight} \cdot P_{World\_Vehicle}(t) \cdot P_{Vehicle\_CamRight}(t))^{-1}$$

$$P_{CamBack\_PatternBack}(t) = (P^{-1}_{World\_PatternBack} \cdot P_{World\_Vehicle}(t) \cdot P_{Vehicle\_CamBack}(t))^{-1}$$

$$P_{CamLeft\_PatternLeft}(t) = (P^{-1}_{World\_PatternLeft} \cdot P_{World\_Vehicle}(t) \cdot P_{Vehicle\_CamLeft}(t))^{-1}; \quad (9)$$

By using these equations from (9) and by applying some constraints, rotation matrices of the cameras 110 relative to the vehicle 310 may be calculated:

$$R_{Vehicle\_CamFront}, R_{Vehicle\_CamRight}, R_{Vehicle\_CamBack}, R_{Vehicle\_CamLeft}$$

The constraints are: (a) The ground is flat; (b) the distances between features on the ground plane are known; (c) the camera system setup on vehicle is rigid; (d) the error between the image features locations and the projected coordinates using equation (9) should be as small as possible; and (e) all features are located on the same ground plane.

The rotation matrices are extrinsic parameters, and in the optimization, the data may be utilized by collecting image data and performing the above calculations at different time instances. In each movement, the motion of the vehicle (three parameters) are the same for all of the cameras. With motion of the vehicle, additional data is available for optimization described below and the precision may thus be improved.

The results (extrinsic parameters for each camera's location and orientation relative to the vehicle) may be optimized in a non-linear optimization by using, for instance, a Levenberg-Marquardt algorithm (e.g., an algorithm used to solve non-linear least squares problems or curve fitting). In the optimization, the following constraints may be used: (a) the ground is flat; (b) the distances between features X on the ground plane are known; (c) the camera system setup on the vehicle 310 is rigid; (d) the error between the image feature X locations and the projected coordinates using (9) should be as small as possible; and (e) all features X are located on the same ground plane.

The optimized projection matrices $P_{opt\_Vehicle\_Cam}$ may be stored as the calibration parameters in the memory 160 for subsequent post-calibration operational use.

SVS Extrinsic Calibration: Three-Pattern Approach

Figure 5A:
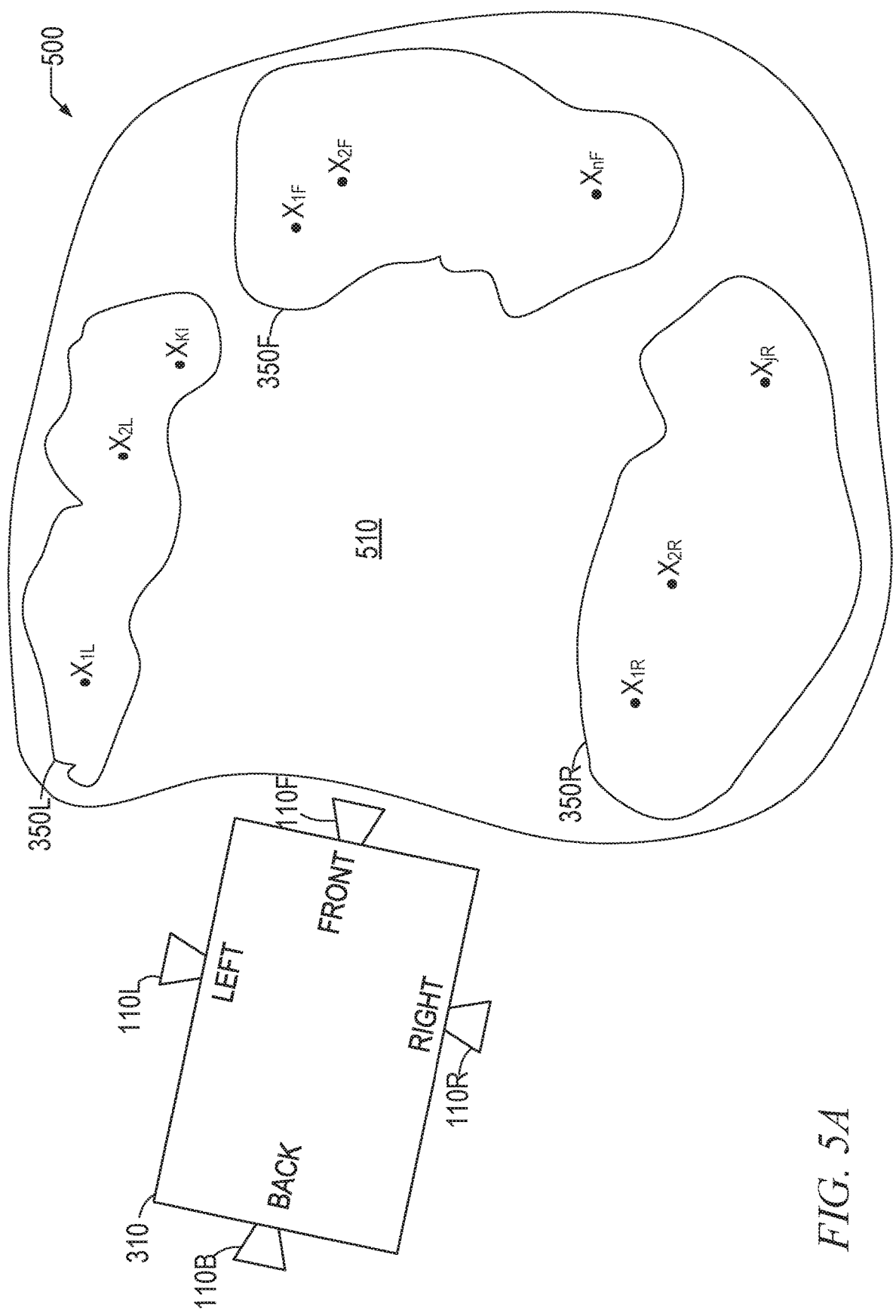
FIG. 5A is a pictorial representation of a vehicle approaching a feature set, according to an example implementation.

FIG. 5A is a pictorial representation of the vehicle 310 approaching the patterns 350 in the Three-pattern Approach. This Approach gives additional flexibility relative to Approaches I and II, as the orientation of the calibration patterns 350 may be determined automatically. Full automatic calibration may be done in this Approach by forward and backward motion of the vehicle 310 among the calibration patterns 350.

In the Three-pattern Approach, the vehicle 310 first approaches the set of calibration patterns 350F, 350R, 350L, which may be laid out in a u-shaped space 510 that the vehicle 310 will fit in. The markings X in this example are on the ground plane, but this is not mandatory. When the markings X are on the ground plane, there is a benefit by having an additional constraint, which is that there is no need to estimate the Z positions of the markings X because they are zero.

When approaching the feature sets X (FIG. 5A) on the calibration patterns 350, the front camera 110F sees all of the features X simultaneously. As a result, the orientation of the ground features X relative to each other can be estimated utilizing equations (1)-(6) discussed above, which may be executed by coded instructions on the extrinsic calibration processor 130.

Figure 5B:
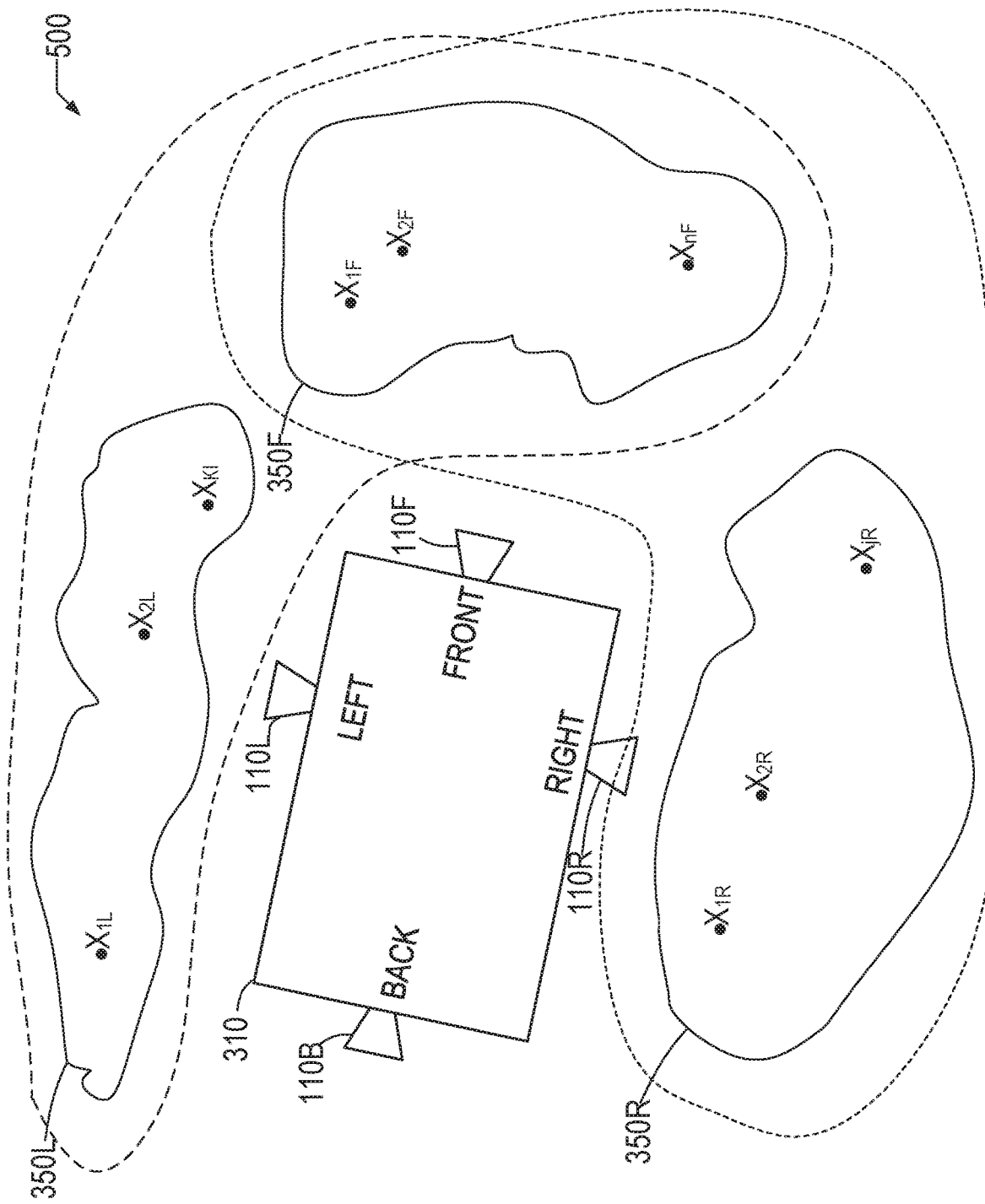
FIG. 5B is a pictorial representation of the vehicle within the feature set, according to the example implementation illustrated in FIG. 5A.

The vehicle 310 then drives between the features (as shown in FIG. 5B, which is a pictorial representation of the vehicle within the patterns 350/feature sets X). The left camera 110L sees the features $X_L$ on the left side in the left pattern 350L, and the front camera 110F sees the corresponding features in the front. This mode of operation is similar to that used in the Four-pattern Approach, correctnamely, that each camera in a pair can see the patterns/features that the other in the pair can see at the same time. In this way, the relative orientation of front 110F to left 110L and front 110 F to right 110R cameras may be estimated. The camera pairs used in the Four-pattern Approach may be utilized here, but a particular camera may be a partner in more than one pair.

This same procedure is subsequently repeated driving backwards. When driving backwards, the orientation of the feature sets X relative to each other may be again estimated, as is the orientation of the back camera 110B to the left 110F and right 110R cameras. Considering that the vehicle 310 with cameras 110 is a rigid body, the forward and backward movement allows finding the positions of the cameras 110 relative to the vehicle 310. In future optimizations, the positions of the cameras 110 relative to the vehicle 310 may be assumed to be correct and are not further optimized.

The optimization procedure may collect and process the following information: (a) for forward driving: obtain relative orientation of the features X to each other and orientation of left 110L and right 110R cameras to the front camera 110F; (b) for backward driving: obtain relative orientation of the features X to each other and orientation of left 110L and right 110R cameras to the back camera 110B; (c) the vehicle 310 drives on the flat surface and the motion is modeled with two translation and one rotation parameters; (d) when driving forward, the distances may be estimated between the front 110F, left 110L, and right 110R cameras seen by the front camera 110F; (e) when driving backward, the distances may be estimated between the left 110L, right 110R, and back 110B cameras seen by the back camera 110B; (f) the estimated distances from left 110L to right 110R cameras obtained in the forward and backward movement may be averaged; (g) for forward movement, the left camera 110L position is estimated (by knowing the distances between the cameras) relative to the vehicle 310; (h) for backward movement, the motion of the front camera 110F is obtained; and (i) the VCS is allocated in the position of the front camera 110F and aligned to a line connecting the front 110F and back 110B cameras.

In this process, the distance to the feature X location on the image and re-projected may be coordinated by using estimated calibration parameters and should be as small as possible. After the relative orientation of calibration boards are known, the rest of Approaches are similar to the Four-pattern Approach, the difference being that the back camera 110B is not viewing simultaneously to the others when the vehicle 310 moves forward, and the front camera 110F is not viewing simultaneously to the others when the vehicle 310 moves backward.

Furthermore, the cameras 110 on the vehicle 310 are a rigid constellation and the distances between them stay constant. The projection matrices may be stored as the calibration parameters in the memory 160 for subsequent post-calibration operational use.

SVS Extrinsic Calibration Processes

The following detailed process descriptions highlight the process flow for each of the Approaches.

Figure 6:
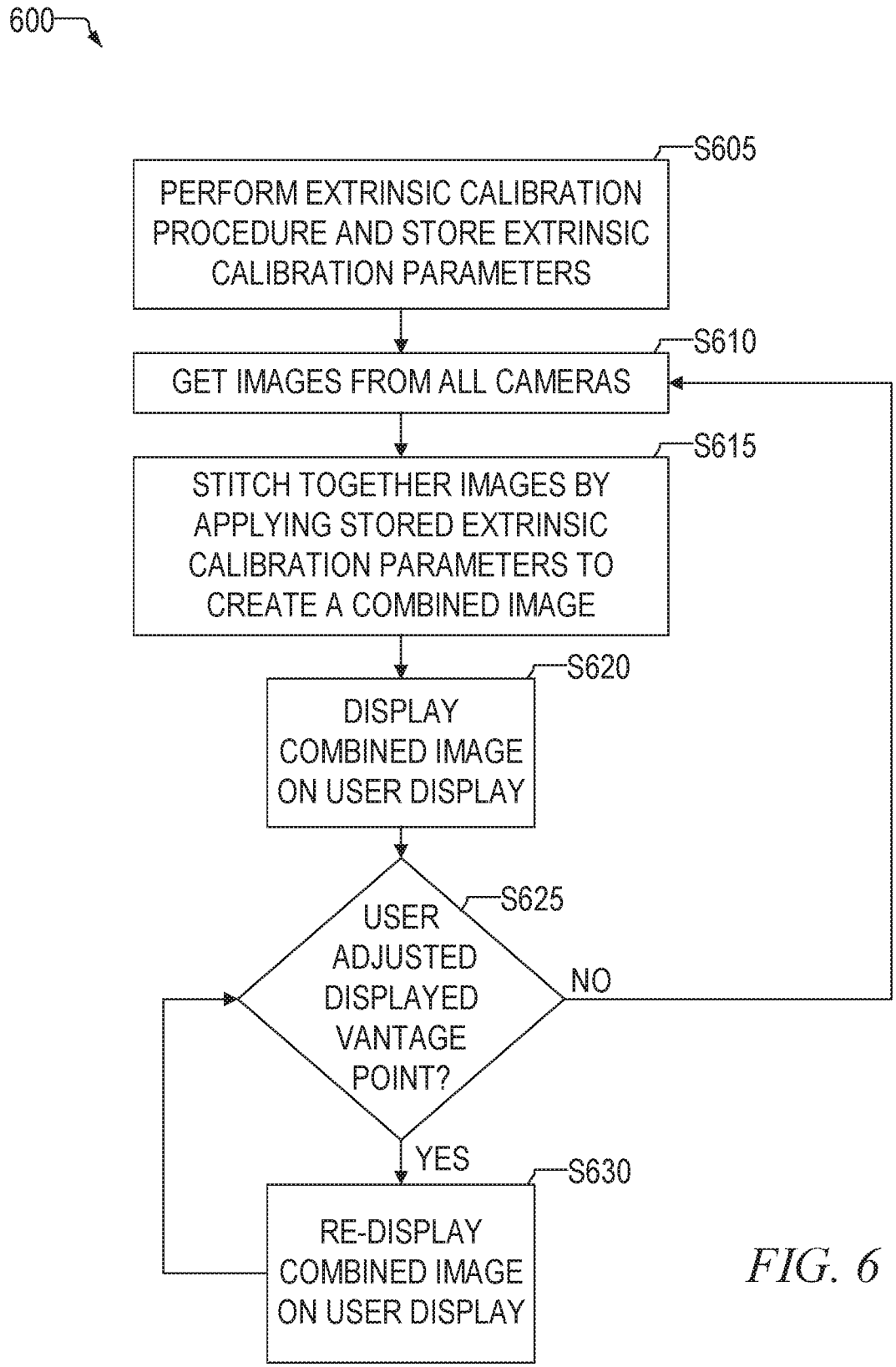
FIG. 6 is a flowchart that provides an overview and a context of an example process applicable to an implementation that includes each of the extrinsic calibration Approaches and subsequent operation of the SVS.

FIG. 6 is a flowchart that provides an overview and a context of a process 600 applicable to each of the extrinsic calibration Approaches and subsequent operation of the SVS 100. Operation S605 is the calibration process that includes Approaches I-III. Operations S610-S630 are elements for operational procedures of the SVS 100. Once the SVS 100 has been calibrated using the extrinsic calibration processor 130 and the calibration parameters have been stored in the memory 160, the SVS 100 may be put into operational use by the vehicle driver.

In an example use case, the vehicle driver may be pulling into a parking space with a car on one side, a curb on the other, and some tree limbs in front. In operation S610, as the driver begins pulling into the parking space, images from all of the cameras 110 are received and may be routed, via the Ethernet switch 120, to the image processor 140. The image processor 140 has access to the memory with the extrinsic calibration parameters 160 that were acquired in operation S605.

In operation S615, the image processor 140 stitches together the images received from the cameras 110 by applying the extrinsic calibration parameters to create a combined image, such as the image 200B. In operation S620, this combined image may then be produced on the display 150. In operation S625, the driver may adjust the displayed vantage point using some form of a user interface mechanism such as a joystick or the like. If the driver adjusts the vantage point (S625: YES), then, in operation S630, the image processor 140 combines and reconstructs the received images from the cameras 110 and reproduces a combined image on the display 150. Otherwise (S625: NO), the SVS 100 may return to receiving and processing the images from the cameras in operation S610. Although FIG. 6 illustrates a tight loop between operation S625 and operation S630 if the user continues to adjust the displayed vantage point, it is also possible that the getting of the images, stitching them, and displaying them could take place simultaneously with the user adjustment of the vantage point in parallel processing operations.

Figure 7:
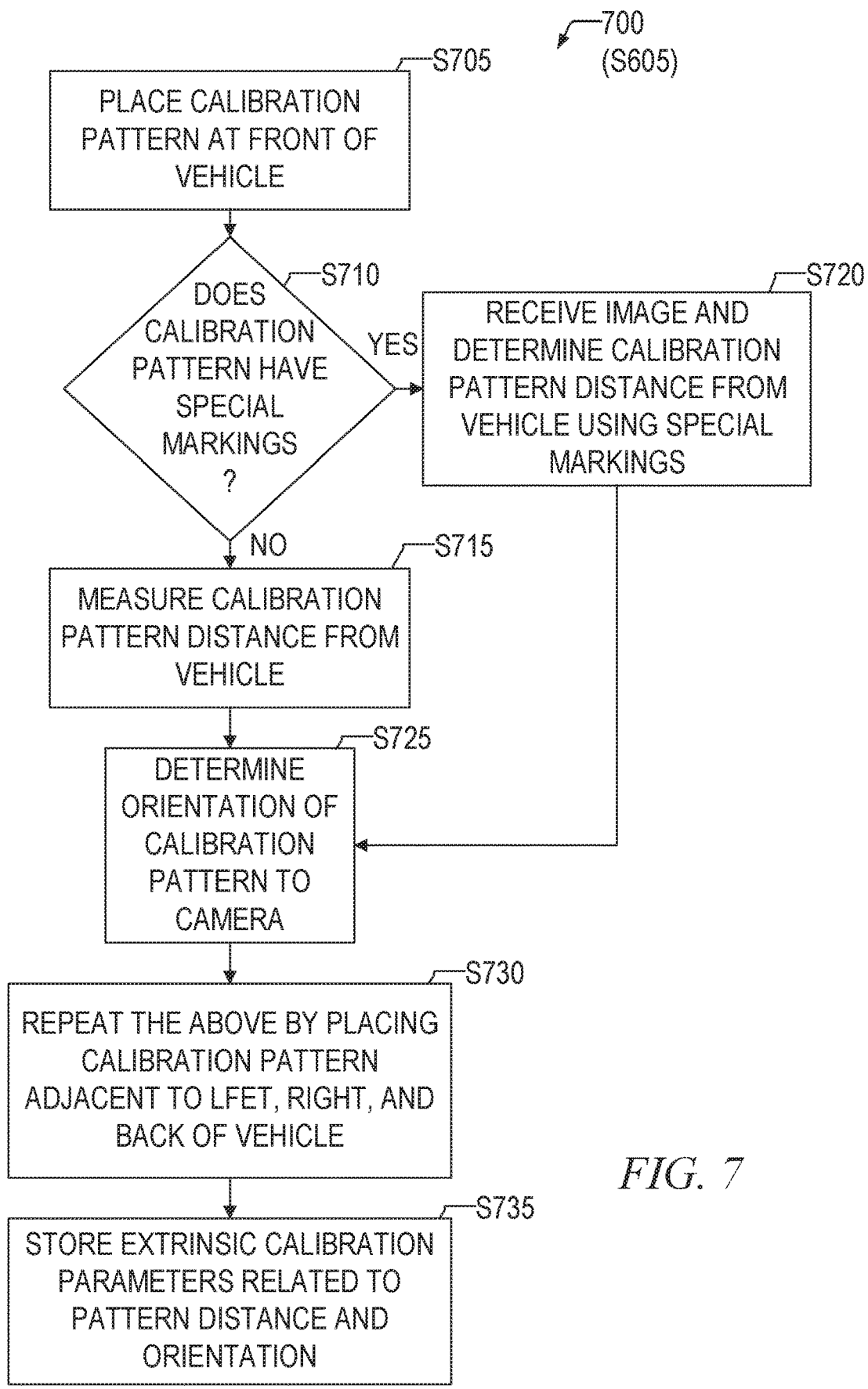
FIG. 7 is a flowchart that illustrates an example implementation of a Single-pattern Approach process.

FIG. 7 is a flowchart that illustrates the Single-pattern Approach process 700 (which is operation S605 in FIG. 6). In operation S705, the calibration pattern 350F is placed at the front of the vehicle 310. If the calibration pattern does not have special markings X (S710: NO), then in operation S720, the calibration pattern 350F distance from the vehicle 310 is measured and entered into the SVS 100. If the calibration pattern 350F has special markings X (S710: YES), then in operation S715, the front camera 110F captures an image and the special markings X are used to determine their distance from the vehicle 310. In operation S725, the image data is used to determine the orientation of the calibration pattern 350F to the front camera 110F, as discussed above.

In operation S730, the calibration pattern 350F is then moved to the left, right, and back sides (in no particular order), and the operation S710 through operation S725 is repeated. Once the calibration pattern 350F has been imaged and processed from all sides of the vehicle 310, in operation S735, the extrinsic calibration parameters may be stored in the memory 160 for subsequent use.

Figure 8:
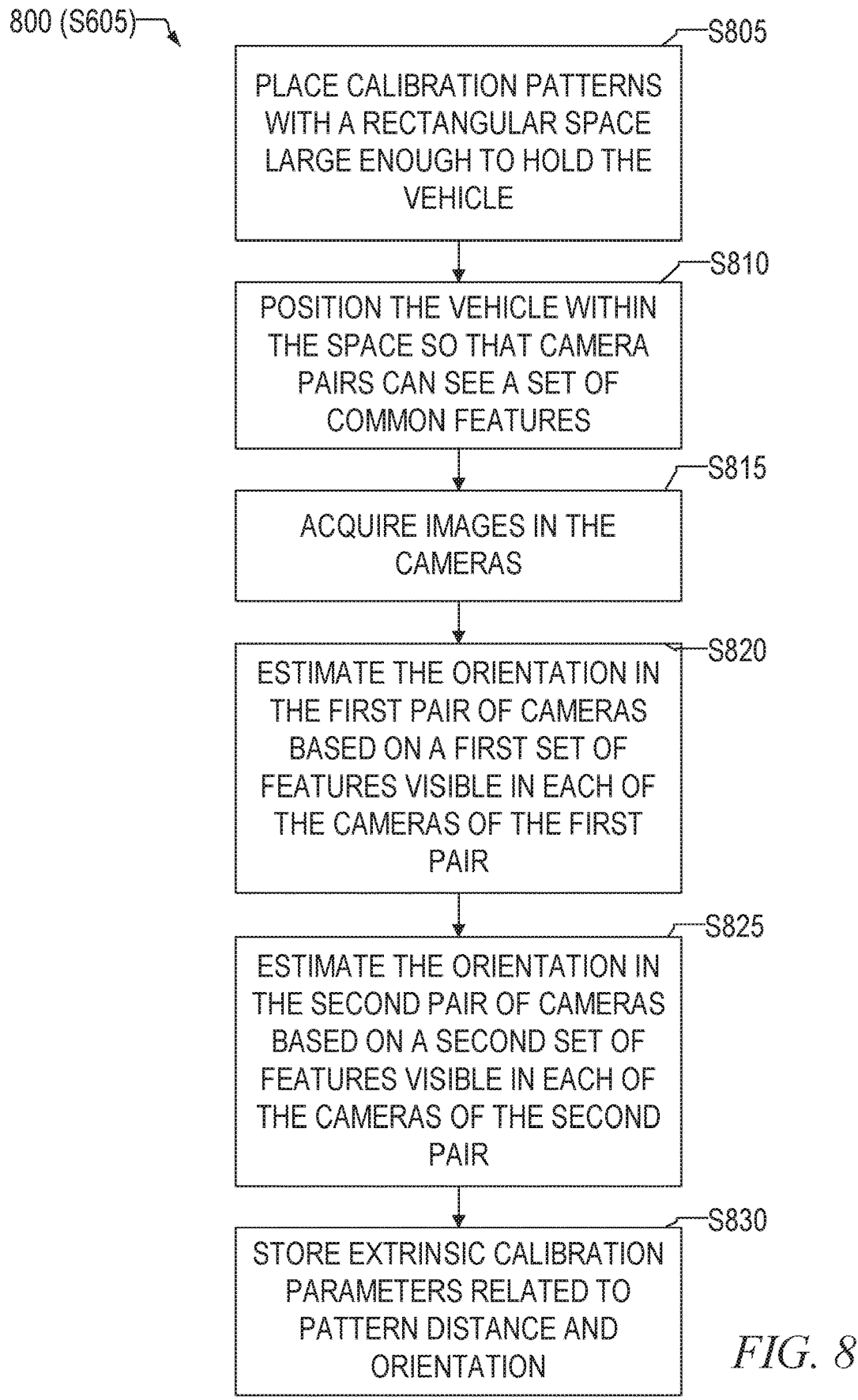
FIG. 8 is a flowchart that illustrates an example implementation of a Four-pattern Approach process.

FIG. 8 is a flowchart that illustrates the Four-pattern Approach process 800 (which is operation S605 in FIG. 6). In operation S805, calibration targets 350F, 350L, 350B, and 350R are placed to create a generally rectangular space 410 that is large enough to hold the vehicle 310. In operation S810, the vehicle 310 is positioned within the space 410 so that adjacent camera pairs (e.g., cameras 110L and 110F) can see a set of common features (e.g., $X_L$ in pattern 350L, or $X_F$ in pattern 350F).

In operation S815, the camera pairs acquire images, and in operation S820, the orientation in a first pair of cameras 110F, 110L is estimated, using the extrinsic calibration processor 130, based on a first set of features $X_L$ visible in each of the camera pairs. In operation S825, the process is repeated for a second pair of cameras 110B, 110R, and the orientation of this second pair is estimated based on a second set of features $X_R$ visible in each of the camera pairs. The pairing in this example is arbitrary, and any pairing of the cameras may be used in this procedure. Once the calibration patterns have been imaged and processed, in operation S830, the extrinsic calibration parameters may be stored in the memory 160 for subsequent use.

Figure 9A:
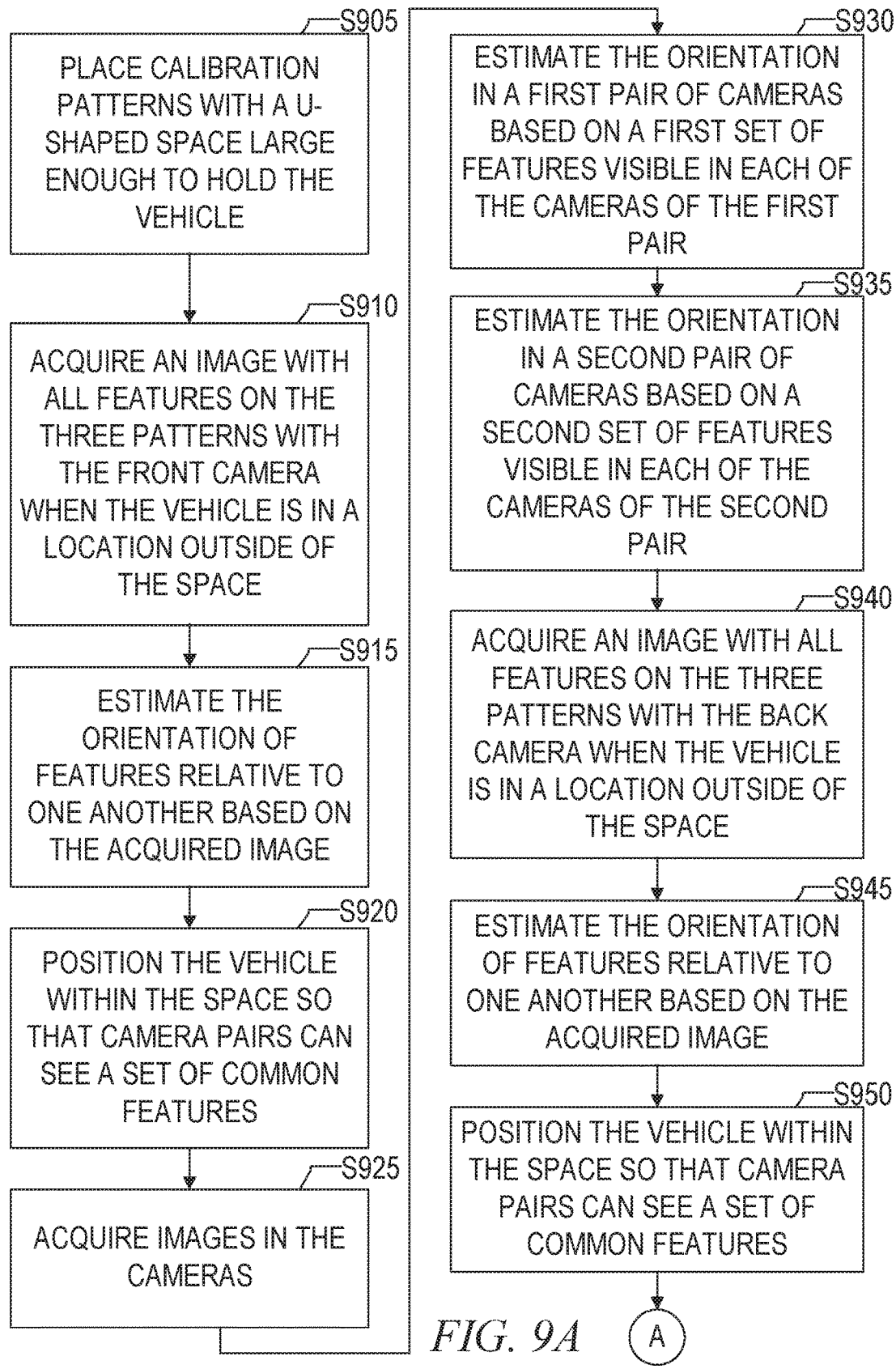
FIGS. 9A and 9B combine to form a flowchart that illustrates an example implementation of a Three-pattern Approach process.
Figure 9B:
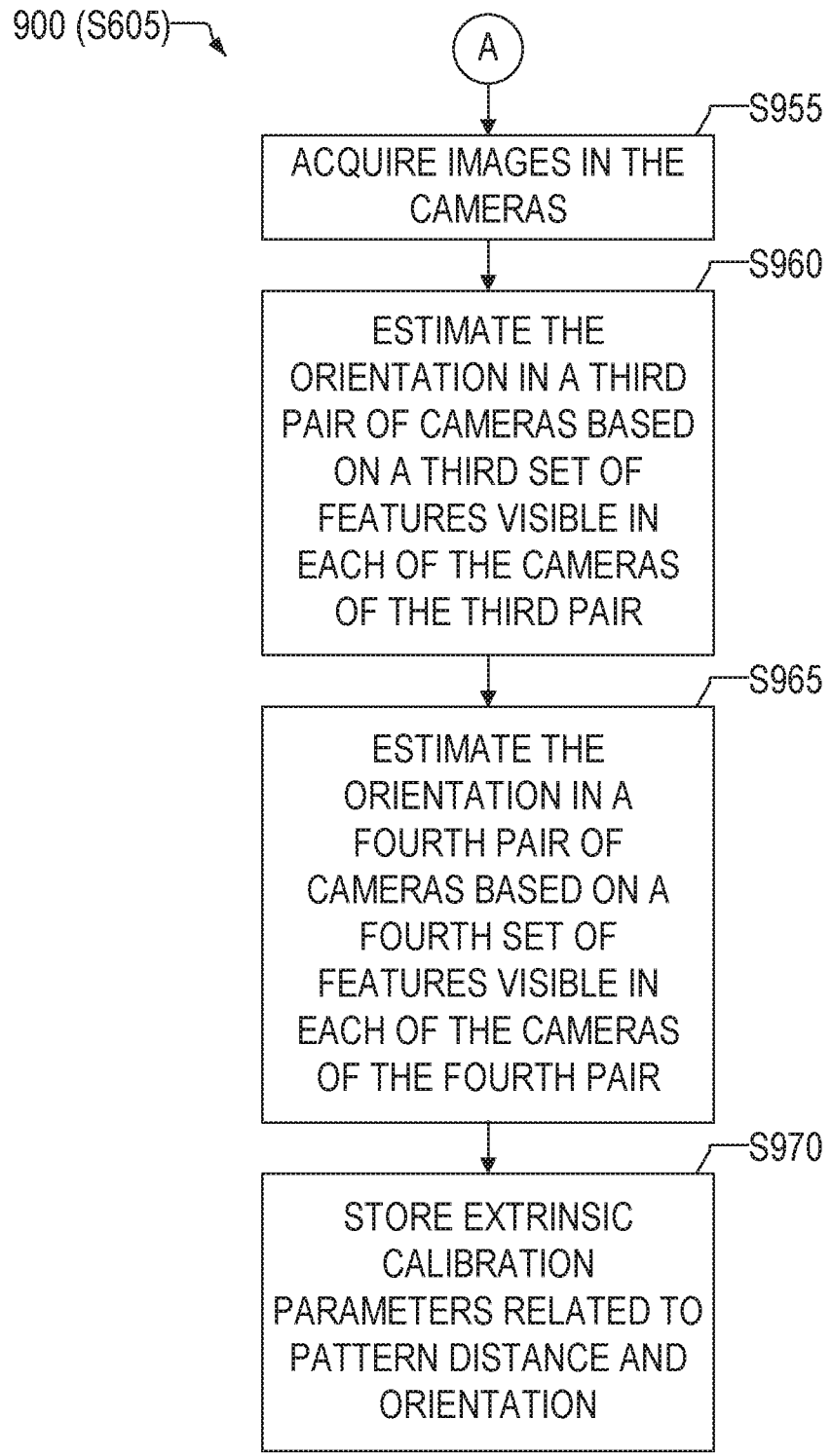

FIGS. 9A and 9B combine to form a flowchart that illustrates the Three-pattern Approach process 900 (which is operation S605 in FIG. 6). In operation S905, calibration targets 350F, 350L, and 350R are placed to create a generally u-shaped space 510 that is large enough to hold the vehicle 310. In operation S910, with the vehicle 310 located outside of the u-shaped space 510, an image is acquired so that all of the features on all of the calibration patterns 350F, 350R, 350L are visible to the front camera 110F.

In operation S915, the orientation of the features X relative to one another are estimated, using the extrinsic calibration processor 130. In operation S920, the vehicle is moved so that it is within the u-shaped space 510 and so that, similar to the Four-pattern Approach, adjacent camera pairs (e.g., cameras 110L and 110F) can see a set of common features (e.g., $X_L$ in pattern 350L, or $X_F$ in pattern 350F). In operation S925, images are acquired in the cameras 110, and in operation S930, the orientation in the first pair of cameras 110F, 110L is estimated, using the extrinsic calibration processor 130, based on a first set of features $X_L$ visible in each of the camera pairs. In operation S935, the process is repeated for a second pair of cameras 110F, 110R, and the orientation of this second pair is estimated based on a second set of features $X_R$ visible in each of the camera pairs.

In operation S940, the vehicle 310 is pulled out of the u-shaped space 510 and turned around so that all of the features on all of the calibration patterns 350F, 350R, 350L are visible to the back camera 110B. The imaging process as was done previously is repeated with the vehicle 310 in reverse. With the vehicle 310 located outside of the u-shaped space 510, an image is acquired so that all of the features on all of the calibration patterns 350F, 350R, 350L are visible to the back camera 110B. In operation S945, the orientation of the features X relative to one another are estimated, using the extrinsic calibration processor 130. In operation S950, the vehicle is moved so that it is within the u-shaped space 510 and so that, similar to the Four-pattern Approach, adjacent camera pairs (e.g., cameras 110R and 110B) can see a set of common features (e.g., $X_L$ in pattern 350L, or $X_F$ in pattern 350F). In operation S955, images are acquired in the cameras 110, and in operation S960, the orientation in the first pair of cameras 110B, 110R is estimated, using the extrinsic calibration processor 130, based on a first set of features $X_L$ visible in each of the camera pairs. In operation S965, the process is repeated for a second pair of cameras 110B, 110L, and the orientation of this second pair is estimated based on a second set of features $X_R$ visible in each of the camera pairs.

Once the calibration patterns 350 have been imaged and processed, in operation S970, the extrinsic calibration parameters may be stored in the memory 160 for subsequent use.

The Approaches discussed above provide similar precision in the estimation of the extrinsic parameters of the SVS. These extrinsic parameters are adequate to provide a reliable perception of the vehicle surroundings to the vehicle operator. The examples given above are four cameras 110, but similar approaches are valid for an arbitrary number of cameras 110. The extrinsic calibration parameters that are stored may be the same for all Approaches.

The benefit of the Single-pattern Approach is that it requires a single calibration pattern 350F. Compared to the Four-pattern Approach, however, the precise measurements of the pattern 350F relative to the vehicle 310 are needed. In the Single-pattern Approach, the pattern 350F can be designed with special markings (features) X and the measurement step can be easily avoided—however, the feature locations X relative to each other should be known. In this case the calibration pattern 350F, and marking/feature locations, may be created for a particular vehicle 310 shape and dimensions. The pattern 350F is moved sequentially to the front, left, right, and rear positions and thus may require more manual effort and time.

In the Four-pattern Approach, the exact positioning of features X relative to the vehicle 310 is no longer required, however, the feature X locations relative to each other should be known. The calibration markings X can be distributed arbitrarily on the ground plane, and the distances between sets of markings X may be obtained by direct measurements. In this design, several patterns 350F, 350R, 350L, 350B (or one large pattern) are needed. As discussed herein, any design considered to use more than one pattern could substitute one larger pattern that combines more than one small pattern, and as such, any use of a phrase relating to multiple patterns herein can also be defined as being a single large pattern.

The Three-pattern Approach provides more automation to be utilized in the calibration procedure, since even the orientation of the calibration patterns 350 may be obtained automatically. There is no need to know feature locations X relative to the vehicle 310 or to know feature locations X relative to each other. However, with this approach, several patterns 350F, 350L, 350R (or one large pattern) are needed.

The following table highlights certain characteristics that may be associated with each Approach.

TABLE 1

Summary of Approach Features

| | Feature locations relative to vehicle known before calibration | Feature locations relative to each other known before calibration | Multiple patterns required |
|---|---|---|---|
| Single-pattern Approach | • | • | |
| Four-pattern Approach | | • | • |
| Three-pattern Approach | | | • |

The Approaches discussed above may be used for extrinsic calibration in the factory at the time of manufacture, at a service or repair shop when having the vehicle serviced, or by the end customers themselves.

Processing Device Description

Figure 10:
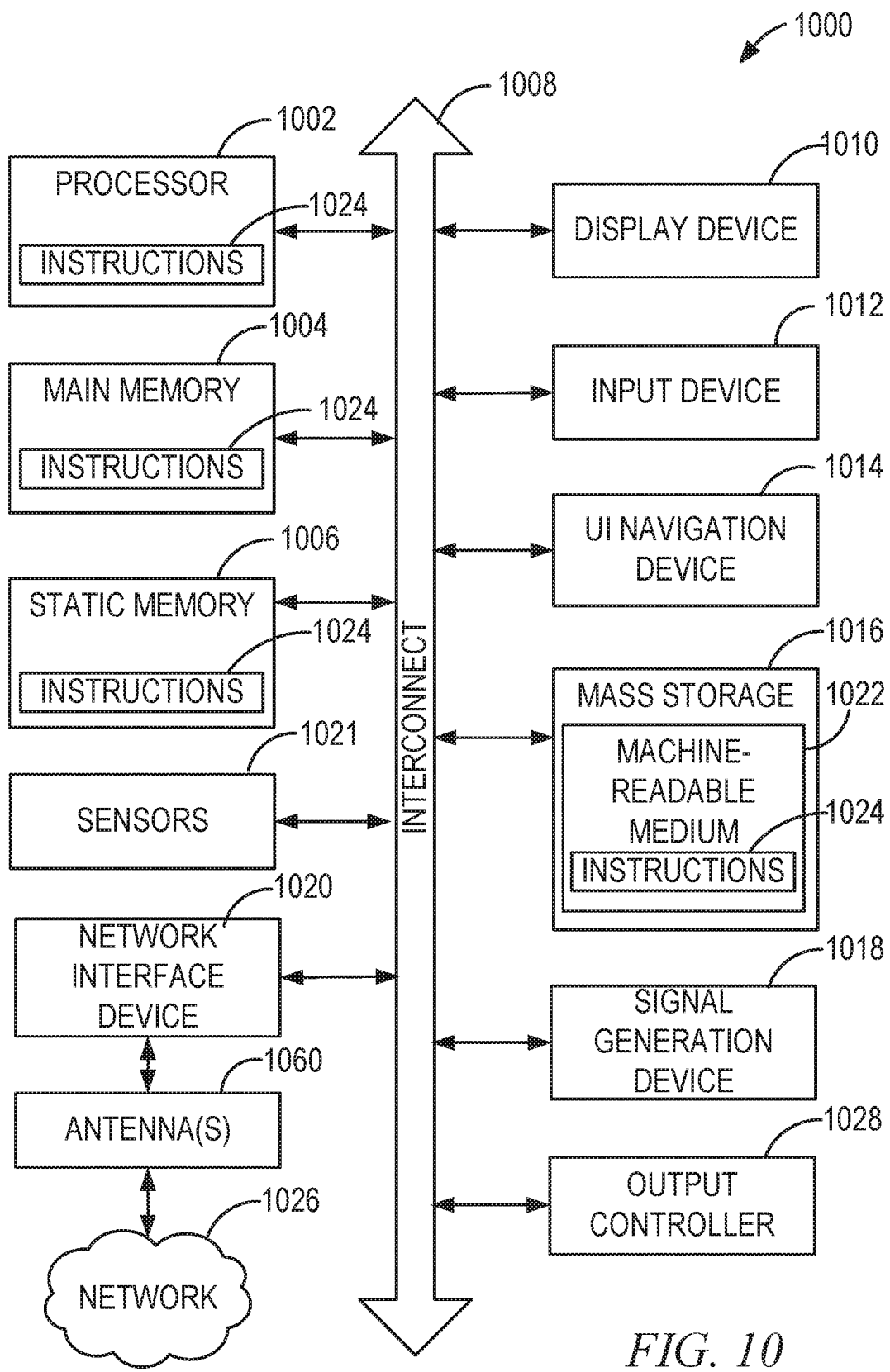
FIG. 10 is a block diagram illustrating a machine in the example form of a computer system.

FIG. 10 is a block diagram illustrating a machine in the example form of a computer system 1000, such as one that might make up the extrinsic calibration processor 130, image processing algorithms and GPU 140, display 150, memory 160, and Ethernet switch 120 discussed above. The computer system 1000 may include a set or sequence of executable instructions to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 1000 includes at least one processor 1002 (e.g., a central processing unit (CPU), a graphics processing unit (GPU) or both, processor cores, compute nodes, etc.), a main memory 1004 and a static memory 1006, which communicate with each other via a link 1008 (e.g., bus). The computer system 1000 may further include a video display unit 1010, an alphanumeric input device 1012 (e.g., a keyboard), and a user interface (UI)

navigation device 1014 (e.g., a mouse). In one embodiment, the video display unit 1010, input device 1012 and UI navigation device 1014 are incorporated into a touch screen display. The computer system 1000 may additionally include a storage device 1016 (e.g., a drive unit), a signal generation device 1018 (e.g., a speaker), a network interface device 1020, and one or more sensors (not shown), such as a global positioning system (GPS) sensor, compass, accelerometer, or other sensor.

The storage device 1016 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004, static memory 1006, and/or within the processor 1002 during execution thereof by the computer system 1000, with the main memory 1004, static memory 1006, and the processor 1002 also constituting machine-readable media.

While the machine-readable medium 1022 is illustrated in an example embodiment to be a single medium, the term "machine-readable medium" may include a single medium or multiple media (e.g., a centralized or distributed database, and/or associated caches and servers) that store the one or more instructions 1024. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1024 may further be transmitted or received over a communications network 1026 using a transmission medium via the network interface device 1020 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, logic or circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

Additional Notes & Examples

The following are Examples related to that above.

Example 1 is an extrinsic camera calibration system (ECCS) comprising: a surround view system (SVS) interface connecting the ECCS to an SVS, the SVS comprising: four cameras mounted to front, back, left, and right sides of a vehicle respectively that are front, back, left, and right cameras; and an imaging interface at which images from the four cameras are output; and a calibration pattern that comprises a set of features; an extrinsic calibration processor; and a network interface that is connected to the four cameras via the imaging interface, wherein the processor is to: receive, from each camera via the network interface, an image comprising captured features from the calibration pattern; and determine and store in the memory extrinsic calibration parameters (ECPs) for each camera that map coordinates of the features to camera coordinates and that are usable for subsequent normal operation of the cameras, the ECPs being determined from the image features.

In Example 2, the subject matter of Example 1 includes, wherein: the images from each camera are images of the calibration pattern that is a same calibration pattern; and the calibration pattern or the vehicle have been positioned relative to each other sequentially for each camera such that the calibration pattern is located in front of the respective camera prior to image capture by that respective camera.

In Example 3, the subject matter of Example 2 includes, wherein locations of the calibration pattern relative to the vehicle are at physically measured distances.

In Example 4, the subject matter of Examples 2-3 includes, wherein locations of the calibration pattern relative to the vehicle are determined by the processor from at least one of a known pattern size or relative feature locations.

In Example 5, the subject matter of Examples 2-4 includes, wherein the ECPs comprise projection matrices for each camera that map vehicle coordinates to camera coordinates determined from the imaged features for each camera, defined as:

$$P_{Vehicle\_CameraFront}, P_{Vehicle\_CameraRight},$$
$$P_{Vehicle\_CameraBack}, P_{Vehicle\_CameraLeft}.$$

In Example 6, the subject matter of Example 5 includes, wherein: the processor is further to determine the projection matrices for each camera that map vehicle coordinates to camera coordinates as:

$$P_{Vehicle\_CameraFront} = P_{Vehicle\_PatternFront} *$$
$$P^{-1}_{CamFront\_PatternFront}$$

$$P_{Vehicle\_CameraRight} = P_{Vehicle\_PatternRight} *$$
$$P^{-1}_{CamFront\_PatternRight}$$

$$P_{Vehicle\_CameraBack} = P_{Vehicle\_PatternBack} *$$
$$P^{-1}_{CamFront\_PatternBack}$$

$$P_{Vehicle\_CameraLeft} = P_{Vehicle\_PatternLeft} *$$
$$P^{-1}_{CamFront\_PatternLeft}$$

where:

$$P_{Vehicle\_PatternFront}, P_{Vehicle\_PatternRight},$$
$$P_{Vehicle\_PatternBack}, P_{Vehicle\_PatternLeft}$$

are projection matrices that map vehicle coordinates to calibration pattern coordinates; and $$P^{-1}_{CamFront\_PatternFront}, P^{-1}_{CamFront\_PatternRight},$$
$$P^{-1}_{CamFront\_PatternBack}, P^{-1}_{CamFront\_PatternLeft}$$

are inverse projection matrices that map camera coordinates to calibration pattern coordinates.

In Example 7, the subject matter of Examples 1-6 includes, wherein: the calibration pattern comprises a left calibration pattern, a right calibration pattern, a front calibration pattern, and a back calibration pattern, arranged to form a rectangular shaped space that is sized to contain the vehicle; and each calibration pattern is visible in two of the cameras when the vehicle is positioned within the rectangular shaped space.

In Example 8, the subject matter of Example 7 includes, wherein the ECPs comprise: projection matrices for each camera that map vehicle camera coordinates to calibration pattern coordinates determined from the imaged features for each camera at a given time (t), defined as:

$$P_{CamFront\_PatternFront}(t), P_{CamRight\_PatternRight}(t),$$
$$P_{CamBack\_PatternBack}(t), P_{CamLeft\_PatternLeft}(t); \text{ and}$$

rotation matrices that map camera rotation angles to vehicle rotation, defined as:

$$R_{Vehicle\_CamFront}, R_{Vehicle\_CamRight}, R_{Vehicle\_CamBack},$$
$$R_{Vehicle\_CamLeft}.$$

In Example 9, the subject matter of Example 8 includes, wherein: the processor is further to determine the projection matrices for each camera that map camera coordinates to pattern coordinates as:

$$P_{CamFront\_PatternFront}(t) = (P^{-1}_{World\_PatternFront} \cdot P_{World\_Vehicle}(t) \cdot P_{Vehicle\_CamFront}(t))^{-1}$$

$$P_{CamRight\_PatternRight}(t) = (P^{-1}_{World\_PatternRight} \cdot P_{World\_Vehicle}(t) \cdot P_{Vehicle\_CamRight}(t))^{-1}$$

$$P_{CamFront\_PatternBack}(t) = (P^{-1}_{World\_PatternBack} \cdot P_{World\_Vehicle}(t) \cdot P_{Vehicle\_CamBack}(t))^{-1}$$

$$P_{CamFront\_PatternLeft}(t) = (P^{-1}_{World\_PatternLeft} \cdot P_{World\_Vehicle}(t) \cdot P_{Vehicle\_CamLeft}(t))^{-1};$$

where:

$$P_{Vehicle\_CamFront}(t), P_{Vehicle\_CamRight}(t), P_{Vehicle\_CamBack}(t), P_{Vehicle\_CamLeft}(t)$$

are projection matrices that map vehicle coordinates to camera coordinates;

$$P^{-1}_{World\_PatternFront}, P^{-1}_{World\_PatternRight}, P^{-1}_{World\_PatternBack}, P^{-1}_{World\_PatternLeft}$$

are inverse projection matrices that map pattern coordinates to world coordinates; and $$P_{World\_Vehicle}(t)$$

is a projection matrix that maps vehicle coordinates to world coordinates.

In Example 10, the subject matter of Example 9 includes, wherein the processor is further to determine $P_{World\_Vehicle}(t)$ by applying:

$$P_{World\_Vehicle}(t) = \begin{bmatrix} \cos\varphi & -\sin\varphi & 0 & t_x \\ \sin\varphi & \cos\varphi & 0 & t_y \\ 0 & 0 & 1 & 0 \\ 0 & 0 & 0 & 1 \end{bmatrix}$$

where:

$\varphi$ is a rotation angle between the vehicle and the world coordinates; and $t_x$ and $t_y$ represent the vehicle translation in the x and y directions on the ground plane.

In Example 11, the subject matter of Examples 1-10 includes, wherein: the calibration pattern comprises a left calibration pattern, a right calibration pattern, and a front calibration pattern, arranged to form a u-shaped space that is sized to contain the vehicle; all calibration patterns are visible to the front camera at a vehicle location outside of the u-shaped space when the vehicle is oriented with the front camera facing the calibration patterns; all calibration patterns are visible to the back camera at the vehicle location outside of the u-shaped space when the vehicle is oriented with the back camera facing the calibration patterns; when the vehicle location is within the u-shaped space and is oriented with the front camera facing the calibration patterns: the front calibration pattern is visible to the front camera; the right calibration pattern is visible to the right camera; and the left calibration pattern is visible to the left camera; and when the vehicle location is within the u-shaped space and is oriented with the back camera facing the calibration patterns: the front calibration pattern is visible to the back camera; the right calibration pattern is visible to the left camera; and the left calibration pattern is visible to the right camera.

In Example 12, the subject matter of Examples 1-11 includes, an image stitcher that is to, in a subsequent normal operation mode: receive further images via the network interface from each of the four cameras at a point in time; stitch together the four further images utilizing the stored ECPs into a single displayable image; and display the single displayable image on a display screen.

In Example 13, the subject matter of Example 12 includes, a view controller that is to: move a vantage point about in 3D space; restitch together the four further images utilizing the stored ECPs and the moved vantage point into a further single displayable image; and display the further single displayable image on the display screen.

In Example 14, the subject matter of Examples 7-13 includes, wherein the processor is further to: obtain and determine the projection matrices at a second time; and perform an optimization on the ECPs based on the projection matrices determined at the second time.

In Example 15, the subject matter of Example 14 includes, wherein the optimization is a non-linear optimization method.

In Example 16, the subject matter of Example 15 includes, wherein the non-linear optimization method is a Levenberg-Marquardt algorithm.

Example 17 is a method performed by an extrinsic calibration system (ECCS) processor comprising: receiving images via a network interface from a surround view system (SVS), the SVS comprising four cameras mounted to front, back, left, and right sides of a vehicle respectively that are front, back, left, and right cameras, wherein each captured image comprises captured features from a calibration pattern located in front of each of the cameras; determining extrinsic calibration parameters (ECPs) for each camera from the image features that map coordinates of the features to camera coordinates and that are usable for subsequent normal operation of the cameras in capturing and displaying subsequent images; and storing, in a memory of the SVS, the ECPs that are accessible by the SVS during the subsequent normal operation.

In Example 18, the subject matter of Example 17 includes, in a subsequent normal operation mode: receiving further images via the network interface from each of the four cameras at a point in time; stitching together the four further images utilizing the stored ECPs into a single displayable image; and displaying the single displayable image on a display screen.

In Example 19, the subject matter of Example 18 includes, in the subsequent normal operation mode: moving a vantage point about in 3D space; restitching together the four further images utilizing the stored ECPs and the moved vantage point into a further single displayable image; and displaying the further single displayable image on the display screen.

In Example 20, the subject matter of Examples 17-19 includes, determining locations of the calibration pattern relative to the vehicle from at least one of a known pattern size or relative feature locations that are utilized in determining the ECPs; wherein the receiving of the images comprises: receiving an image from the front camera when the calibration pattern is moved in front of the front camera; receiving an image from the right camera when the calibration pattern is moved in front of the right camera; receiving an image from the left camera when the calibration pattern is moved in front of the left camera; and receiving an image from the back camera when the calibration pattern is moved in front of the back camera.

In Example 21, the subject matter of Example 20 includes, determining projection matrices as a part of the ECPs for each camera that map vehicle coordinates to camera coordinates as:

$$P_{Vehicle\_CameraFront} = P_{Vehicle\_PatternFront} * P^{-1}_{CamFront\_PatternFront}$$

$$P_{Vehicle\_CameraRight} = P_{Vehicle\_PatternRight} * P^{-1}_{CamFront\_PatternRight}$$

$$P_{Vehicle\_CameraBack} = P_{Vehicle\_PatternBack} * P^{-1}_{CamFront\_PatternBack}$$

$$P_{Vehicle\_CameraLeft} = P_{Vehicle\_PatternLeft} * P^{-1}_{CamFront\_PatternLeft}$$

where:

$$P_{Vehicle\_PatternFront}, P_{Vehicle\_PatternRight}, P_{Vehicle\_PatternBack}, P_{Vehicle\_PatternLeft}$$

are projection matrices that map vehicle coordinates to calibration pattern coordinates; and $$P^{-1}_{CamFront\_PatternFront}, P^{-1}_{CamFront\_PatternRight}, P^{-1}_{CamFront\_PatternBack}, P^{-1}_{CamFront\_PatternLeft}$$

are inverse projection matrices that map camera coordinates to calibration pattern coordinates.

In Example 22, the subject matter of Examples 17-21 includes, wherein: the calibration pattern comprises a left calibration pattern, a right calibration pattern, a front calibration pattern, and a back calibration pattern, arranged to form a rectangular shaped space that is sized to contain the vehicle; and each calibration pattern is visible in two of the cameras when the vehicle is positioned with the rectangular shaped space.

In Example 23, the subject matter of Example 22 includes, determining projection matrices as a part of the ECPs for each camera that map vehicle camera coordinates to calibration pattern coordinates determined from the imaged features for each camera taken at a given time (t), defined as:

$$P_{CamFront\_PatternFront}(t), P_{CamRight\_PatternRight}(t), P_{CamBack\_PatternBack}(t), P_{CamLeft\_PatternLeft}(t);$$

wherein the projection matrices are determined by:

$$P_{CamFront\_PatternFront}(t) = (P^{-1}_{World\_PatternFront} \cdot P_{World\_Vehicle}(t) \cdot P_{Vehicle\_CamFront}(t))^{-1}$$

$$P_{CamRight\_PatternRight}(t) = (P^{-1}_{World\_PatternRight} \cdot P_{World\_Vehicle}(t) \cdot P_{Vehicle\_CamRight}(t))^{-1}$$

$$P_{CamBack\_PatternBack}(t) = (P^{-1}_{World\_PatternBack} \cdot P_{World\_Vehicle}(t) \cdot P_{Vehicle\_CamBack}(t))^{-1}$$

$$P_{CamLeft\_PatternLeft}(t) = (P^{-1}_{World\_PatternLeft} \cdot P_{World\_Vehicle}(t) \cdot P_{Vehicle\_CamLeft}(t))^{-1};$$

where:

$$P_{Vehicle\_CamFront}(t), P_{Vehicle\_CamRight}(t), P_{Vehicle\_CamBack}(t), P_{Vehicle\_CamLeft}(t)$$

are projection matrices that map vehicle coordinates to camera coordinates;

$$P^{-1}_{World\_PatternFront}, P^{-1}_{World\_PatternRight}, P^{-1}_{World\_PatternBack}, P^{-1}_{World\_PatternLeft}$$

are inverse projection matrices that map pattern coordinates to world coordinates; and $$P_{World\_Vehicle}(t)$$

is a projection matrix that maps vehicle coordinates to world coordinates and is determined by $$P_{World\_Vehicle}(t) = \begin{bmatrix} \cos\varphi & -\sin\varphi & 0 & t_x \\ \sin\varphi & \cos\varphi & 0 & t_y \\ 0 & 0 & 1 & 0 \\ 0 & 0 & 0 & 1 \end{bmatrix}$$

where:
$\varphi$ is a rotation angle between the vehicle and the world coordinates; and
$t_x$ and $t_y$ represent the vehicle translation in the x and y directions on the ground plane; and
determining rotation matrices that map camera rotation angles to vehicle rotation, defined as:

$$R_{Vehicle\_CamFront}, R_{Vehicle\_CamRight}, R_{Vehicle\_CamBack}, R_{Vehicle\_CamLeft}.$$

In Example 24, the subject matter of Examples 22-23 includes, obtaining and determining the projection matrices at a second time; and performing an optimization on the ECPs based on the projection matrices determined at the second time.

In Example 25, the subject matter of Example 24 includes, wherein the optimization is a non-linear optimization method.

In Example 26, the subject matter of Example 25 includes, wherein the non-linear optimization method is a Levenberg-Marquardt algorithm.

In Example 27, the subject matter of Examples 17-26 includes, wherein: the calibration pattern comprises a left calibration pattern, a right calibration pattern, and a front calibration pattern, arranged to form a u-shaped space that is sized to contain the vehicle; wherein the receiving of the images comprises: receiving an image containing all of the calibration patterns from the front camera at a vehicle location outside of the u-shaped space when the vehicle is oriented with the front camera facing the calibration patterns; receiving an image containing all of the calibration patterns from the back camera at the vehicle location outside of the u-shaped space when the vehicle is oriented with the back camera facing the calibration patterns; when the vehicle location is within the u-shaped space and is oriented with the front camera facing the calibration patterns: receiving an image containing the front calibration pattern from the front camera; receiving an image containing the right calibration pattern from the right camera; and receiving an image containing the left calibration pattern from the left camera; and when the vehicle location is within the u-shaped space and is oriented with the back camera facing the calibration patterns: receiving an image containing the front calibration pattern from the back camera; receiving an image containing the right calibration pattern from the left camera; and receiving an image containing the left calibration pattern from the right camera.

Example 28 is a method for operating an extrinsic calibration system (ECCS) comprising: positioning one or more calibration patterns in front of four cameras mounted to front, back, left, and right sides of a vehicle respectively that are front, back, left, and right cameras that make up a surround view system (SVS); receiving images via a network interface from each of the four cameras, wherein each captured image comprises captured features from the one or more calibration patterns that are located in front of each of the cameras; determining extrinsic calibration parameters (ECPs) for each camera from the image features that map coordinates of the features to camera coordinates and that are usable for subsequent normal operation of the cameras in capturing and displaying subsequent images; and storing, in a memory of the SVS, the ECPs that are accessible by the SVS during the subsequent normal operation.

In Example 29, the subject matter of Example 28 includes, wherein: the positioning of the one or more calibration patterns comprises positioning a single calibration pattern in front of each camera sequentially prior to receiving the image from each camera; and the positioning of the single calibration pattern comprises at least one of moving the calibration pattern relative to the vehicle or moving the vehicle relative to the calibration pattern.

Example 30 is at least one machine-readable medium including instructions, which when executed by a processor of an extrinsic camera calibration system (ECCS), cause the processor to: receive images via a network interface from a surround view system (SVS) comprising four cameras mounted to front, back, left, and right sides of a vehicle respectively that are front, back, left, and right cameras, wherein each captured image comprises captured features from a calibration pattern placed in front of each of the cameras; determine extrinsic calibration parameters (ECPs) for each camera from the image features that map coordinates of the features to camera coordinates and that are usable for subsequent normal operation of the cameras in capturing and displaying subsequent images; and store, in a memory of the SVS, the ECPs that are accessible by the SVS during the subsequent normal operation.

In Example 31, the subject matter of Example 30 includes, wherein the instructions further cause the processor to: determine locations of the calibration pattern relative to the vehicle from at least one of a known pattern size or relative feature locations; wherein the receipt of the images comprises having the processor: receive an image from the front camera when the calibration pattern is moved in front of the front camera; receive an image from the right camera when the calibration pattern is moved in front of the right camera; receive an image from the left camera when the calibration pattern is moved in front of the left camera; and receive an image from the back camera when the calibration pattern is moved in front of the back camera.

In Example 32, the subject matter of Examples 30-31 includes, wherein: the calibration pattern comprises a left calibration pattern, a right calibration pattern, a front calibration pattern, and a back calibration pattern, arranged to form a rectangular shaped space that is sized to contain the vehicle; and each calibration pattern is visible in two of the cameras when the vehicle is positioned with the rectangular shaped space.

In Example 33, the subject matter of Examples 30-32 includes, wherein: the calibration pattern comprises a left calibration pattern, a right calibration pattern, and a front calibration pattern, arranged to form a u-shaped space that is sized to contain the vehicle; wherein the receipt of the images comprises having the processor: receive an image containing all of the calibration patterns from the front camera at a vehicle location outside of the u-shaped space when the vehicle is oriented with the front camera facing the calibration patterns; receive an image containing all of the calibration patterns from the back camera at the vehicle location outside of the u-shaped space when the vehicle is oriented with the back camera facing the calibration patterns; when the vehicle location is within the u-shaped space and is oriented with the front camera facing the calibration patterns: receive an image containing the front calibration pattern from the front camera; receive an image containing the right calibration pattern from the right camera; and receive an image containing the left calibration pattern from the left camera; and when the vehicle location is within the u-shaped space and is oriented with the back camera facing the calibration patterns: receive an image containing the front calibration pattern from the back camera; receive an image containing the right calibration pattern from the left camera; and receive an image containing the left calibration pattern from the right camera.

In Example 34, the subject matter of Example 30 includes, wherein the instructions further cause the processor to, in a subsequent normal operation mode: receive further images via the network interface from each of the four cameras at a point in time; stitch together the four further images utilizing the stored ECPs into a single displayable image; and display the single displayable image on a display screen.

In Example 35, the subject matter of Example 34 includes, wherein the instructions further cause the processor to, in the subsequent normal operation mode: move a vantage point about in 3D space; restitch together the four further images utilizing the stored ECPs and the moved vantage point into a further single displayable image; and display the further single displayable image on the display screen.

In Example 36, the subject matter of Example 30 includes, wherein the instructions further cause the processor to: determine locations of the calibration pattern relative to the vehicle from at least one of a known pattern size or relative feature locations that are utilized in determining the ECPs; wherein the receipt of the images comprises causing the processor to: receive an image from the front camera when the calibration pattern is moved in front of the front camera; receive an image from the right camera when the calibration pattern is moved in front of the right camera; receive an image from the left camera when the calibration pattern is moved in front of the left camera; and receive an image from the back camera when the calibration pattern is moved in front of the back camera.

In Example 37, the subject matter of Example 36 includes, wherein the instructions further cause the processor to: determine projection matrices as a part of the ECPs for each camera that map vehicle coordinates to camera coordinates as:

$$P_{Vehicle\_CameraFront} = P_{Vehicle\_PatternFront} * P^{-1}_{CamFront\_PatternFront}$$

$$P_{Vehicle\_CameraRight} = P_{Vehicle\_PatternRight} * P^{-1}_{CamFront\_PatternRight}$$

$$P_{Vehicle\_CameraBack} = P_{Vehicle\_PatternBack} * P^{-1}_{CamFront\_PatternBack}$$

$$P_{Vehicle\_CameraLeft} = P_{Vehicle\_PatternLeft} * P^{-1}_{CamFront\_PatternLeft}$$

where:

$$P_{Vehicle\_PatternFront}, P_{Vehicle\_PatternRight}, P_{Vehicle\_PatternBack}, P_{Vehicle\_PatternLeft}$$

are projection matrices that map vehicle coordinates to calibration pattern coordinates; and $$P^{-1}_{CamFront\_PatternFront}, P^{-1}_{CamFront\_PatternRight}, P^{-1}_{CamFront\_PatternBack}, P^{-1}_{CamFront\_PatternLeft}$$

are inverse projection matrices that map camera coordinates to calibration pattern coordinates.

In Example 38, the subject matter of Example 30 includes, wherein: the calibration pattern comprises a left calibration pattern, a right calibration pattern, a front calibration pattern, and a back calibration pattern, arranged to form a rectangular shaped space that is sized to contain the vehicle; and each calibration pattern is visible in two of the cameras when the vehicle is positioned with the rectangular shaped space.

In Example 39, the subject matter of Example 38 includes, wherein the instructions further cause the processor to: determine projection matrices as a part of the ECPs for each camera that map vehicle camera coordinates to calibration pattern coordinates determined from the imaged features for each camera taken at a given time (t), defined as:

$$P_{CamFront\_PatternFront}(t), P_{CamRight\_PatternRight}(t),$$
$$P_{CamBack\_PatternBack}(t), P_{CamLeft\_PatternLeft}(t);$$

wherein the projection matrices are determined by:

$$P_{CamFront\_PatternFront}(t) = (P^{-1}_{World\_PatternFront} \cdot P_{World\_Vehicle}(t) \cdot P_{Vehicle\_CamFront}(t))^{-1}$$

$$P_{CamRight\_PatternRight}(t) = (P^{-1}_{World\_PatternRight} \cdot P_{World\_Vehicle}(t) \cdot P_{Vehicle\_CamRight}(t))^{-1}$$

$$P_{CamBack\_PatternBack}(t) = (P^{-1}_{World\_PatternBack} \cdot P_{World\_Vehicle}(t) \cdot P_{Vehicle\_CamBack}(t))^{-1}$$

$$P_{CamLeft\_PatternLeft}(t) = (P^{-1}_{World\_PatternLeft} \cdot P_{World\_Vehicle}(t) \cdot P_{Vehicle\_CamLeft}(t))^{-1};$$

where:

$$P_{Vehicle\_CamFront}(t), P_{Vehicle\_CamRight}(t), P_{Vehicle\_CamBack}(t), P_{Vehicle\_CamLeft}(t)$$

are projection matrices that map vehicle coordinates to camera coordinates;

$$P^{-1}_{World\_PatternFront}, P^{-1}_{World\_PatternRight}, P^{-1}_{World\_PatternBack}, P^{-1}_{World\_PatternLeft}$$

are inverse projection matrices that map pattern coordinates to world coordinates; and $$P_{World\_Vehicle}(t)$$

is a projection matrix that maps vehicle coordinates to world coordinates and is determined by $$P_{World\_Vehicle}(t) = \begin{bmatrix} \cos\varphi & -\sin\varphi & 0 & t_x \\ \sin\varphi & \cos\varphi & 0 & t_y \\ 0 & 0 & 1 & 0 \\ 0 & 0 & 0 & 1 \end{bmatrix}$$

where:
- φ is a rotation angle between the vehicle and the world coordinates; and
- $t_x$ and $t_y$ represent the vehicle translation in the x and y directions on the ground plane; and
- determine rotation matrices that map camera rotation angles to vehicle rotation, defined as:

$$R_{Vehicle\_CamFront}, R_{Vehicle\_CamRight}, R_{Vehicle\_CamBack}, R_{Vehicle\_CamLeft}.$$

In Example 40, the subject matter of Examples 38-39 includes, wherein the instructions further cause the processor to: obtain and determine the projection matrices at a second time; and perform an optimization on the ECPs based on the projection matrices determined at the second time.

In Example 41, the subject matter of Example 40 includes, wherein the optimization is a non-linear optimization method.

In Example 42, the subject matter of Example 41 includes, wherein the non-linear optimization method is a Levenberg-Marquardt algorithm.

In Example 43, the subject matter of Example 30 includes, wherein: the calibration pattern comprises a left calibration pattern, a right calibration pattern, and a front calibration pattern, arranged to form a u-shaped space that is sized to contain the vehicle; wherein the receipt of the images comprises: receive an image containing all of the calibration patterns from the front camera at a vehicle location outside of the u-shaped space when the vehicle is oriented with the front camera facing the calibration patterns; receive an image containing all of the calibration patterns from the back camera at the vehicle location outside of the u-shaped space when the vehicle is oriented with the back camera facing the calibration patterns; when the vehicle location is within the u-shaped space and is oriented with the front camera facing the calibration patterns: receive an image containing the front calibration pattern from the front camera; receive an image containing the right calibration pattern from the right camera; and receive an image containing the left calibration pattern from the left camera; and when the vehicle location is within the u-shaped space and is oriented with the back camera facing the calibration patterns: receive an image containing the front calibration pattern from the back camera; receive an image containing the right calibration pattern from the left camera; and receive an image containing the left calibration pattern from the right camera.

Example 44 is a method for operating an extrinsic calibration system (ECCS) comprising: positioning one or more calibration patterns in front of four cameras mounted to front, back, left, and right sides of a vehicle respectively that are front, back, left, and right cameras that make up a surround view system (SVS); receiving images via a network interface from each of the four cameras, wherein each captured image comprises captured features from the one or more calibration patterns that are located in front of each of the cameras; determining extrinsic calibration parameters (ECPs) for each camera from the image features that map coordinates of the features to camera coordinates and that are usable for subsequent normal operation of the cameras in capturing and displaying subsequent images; and storing, in a memory of the SVS, the ECPs that are accessible by the SVS during the subsequent normal operation.

In Example 45, the subject matter of Example 44 includes, wherein: the positioning of the one or more calibration patterns comprises positioning a single calibration pattern in front of each camera sequentially prior to receiving the image from each camera; and the positioning of the single calibration pattern comprises at least one of moving the calibration pattern relative to the vehicle or moving the vehicle relative to the calibration pattern.

Example 46 is an extrinsic calibration system (ECCS) processor comprising: means for receiving images via a network interface from a surround view system (SVS), the SVS comprising four cameras mounted to front, back, left, and right sides of a vehicle respectively that are front, back, left, and right cameras, wherein each captured image comprises captured features from a calibration pattern located in front of each of the cameras; means for determining extrinsic calibration parameters (ECPs) for each camera from the image features that map coordinates of the features to camera coordinates and that are usable for subsequent normal operation of the cameras in capturing and displaying subsequent images; and means for storing, in a memory of the SVS, the ECPs that are accessible by the SVS during the subsequent normal operation.

In Example 47, the subject matter of Example 46 includes, means for receiving further images via the network interface from each of the four cameras at a point in time; means for stitching together the four further images utilizing the stored ECPs into a single displayable image; and means for displaying the single displayable image on a display screen.

In Example 48, the subject matter of Examples 46-47 includes, means for determining locations of the calibration pattern relative to the vehicle from at least one of a known pattern size or relative feature locations that are utilized in determining the ECPs; wherein the means for the receiving of the images comprises: means for receiving an image from the front camera when the calibration pattern is moved in front of the front camera; means for receiving an image from the right camera when the calibration pattern is moved in front of the right camera; means for receiving an image from the left camera when the calibration pattern is moved in front of the left camera; and means for receiving an image from the back camera when the calibration pattern is moved in front of the back camera.

In Example 49, the subject matter of Example 48 includes, means for determining projection matrices as a part of the ECPs for each camera that map vehicle coordinates to camera coordinates as:

$$P_{Vehicle\_CameraFront} = P_{Vehicle\_PatternFront} * P^{-1}_{CamFront\_PatternFront}$$

$$P_{Vehicle\_CameraRight} = P_{Vehicle\_PatternRight} * P^{-1}_{CamFront\_PatternRight}$$

$$P_{Vehicle\_CameraBack} = P_{Vehicle\_PatternBack} * P^{-1}_{CamFront\_PatternBack}$$

$$P_{Vehicle\_CameraLeft} = P_{Vehicle\_PatternLeft} * P^{-1}_{CamFront\_PatternLeft}$$

where:

$P_{Vehicle\_PatternFront}, P_{Vehicle\_PatternRight},$
$P_{Vehicle\_PatternBack}, P_{Vehicle\_PatternLeft}$ are projection matrices that map vehicle coordinates to calibration pattern coordinates; and $P^{-1}_{CamFront\_PatternFront}, P^{-1}_{CamFront\_PatternRight},$
$P^{-1}_{CamFront\_PatternBack}, P^{-1}_{CamFront\_PatternLeft}$ are inverse projection matrices that map camera coordinates to calibration pattern coordinates.

In Example 50, the subject matter of Examples 47-49 includes, wherein: the calibration pattern comprises a left calibration pattern, a right calibration pattern, a front calibration pattern, and a back calibration pattern, arranged to form a rectangular shaped space that is sized to contain the vehicle; and each calibration pattern is visible in two of the cameras when the vehicle is positioned with the rectangular shaped space.

In Example 51, the subject matter of Example 50 includes, means for determining projection matrices as a part of the ECPs for each camera that map vehicle camera coordinates to calibration pattern coordinates determined from the imaged features for each camera taken at a given time (t), defined as:

$P_{CamFront\_PatternFront}(t), P_{CamRight\_PatternRight}(t),$
$P_{CamBack\_PatternBack}(t), P_{CamLeft\_PatternLeft}(t);$ wherein the projection matrices are determined by:

$$P_{CamFront\_PatternFront}(t) = (P^{-1}_{World\_PatternFront} \cdot P_{World\_Vehicle}(t) \cdot P_{Vehicle\_CamFront}(t))^{-1}$$

$$P_{CamRight\_PatternRight}(t) = (P^{-1}_{World\_PatternRight} \cdot P_{World\_Vehicle}(t) \cdot P_{Vehicle\_CamRight}(t))^{-1}$$

$$P_{CamBack\_PatternBack}(t) = (P^{-1}_{World\_PatternBack} \cdot P_{World\_Vehicle}(t) \cdot P_{Vehicle\_CamBack}(t))^{-1}$$

$$P_{CamLeft\_PatternLeft}(t) = (P^{-1}_{World\_PatternLeft} \cdot P_{World\_Vehicle}(t) \cdot P_{Vehicle\_CamLeft}(t))^{-1};$$

where:

$P_{Vehicle\_CamFront}(t), P_{Vehicle\_CamRight}(t), P_{Vehicle\_CamBack}(t), P_{Vehicle\_CamLeft}(t)$ are projection matrices that map vehicle coordinates to camera coordinates;

$P^{-1}_{World\_PatternFront}, P^{-1}_{World\_PatternRight},$
$P^{-1}_{World\_PatternBack}, P^{-1}_{World\_PatternLeft}$ are inverse projection matrices that map pattern coordinates to world coordinates; and $P_{World\_Vehicle}(t)$ is a projection matrix that maps vehicle coordinates to world coordinates and is determined by $$P_{World\_Vehicle}(t) = \begin{bmatrix} \cos\varphi & -\sin\varphi & 0 & t_x \\ \sin\varphi & \cos\varphi & 0 & t_y \\ 0 & 0 & 1 & 0 \\ 0 & 0 & 0 & 1 \end{bmatrix}$$

where:
$\varphi$ is a rotation angle between the vehicle and the world coordinates; and
$t_x$ and $t_y$ represent the vehicle translation in the x and y directions on the ground plane; and
means for determining rotation matrices that map camera rotation angles to vehicle rotation, defined as:

$R_{Vehicle\_CamFront}, R_{Vehicle\_CamRight}, R_{Vehicle\_CamBack}, R_{Vehicle\_CamLeft}.$ In Example 52, the subject matter of Examples 50-51 includes, means for obtaining and determining the projection matrices at a second time; and means for performing an optimization on the ECPs.

In Example 53, the subject matter of Example 52 includes, wherein the optimization is a non-linear optimization method.

In Example 54, the subject matter of Example 53 includes, wherein the non-linear optimization method is a Levenberg-Marquardt algorithm.

In Example 55, the subject matter of Examples 46-54 includes, wherein: the calibration pattern comprises a left calibration pattern, a right calibration pattern, and a front calibration pattern, arranged to form a u-shaped space that is sized to contain the vehicle; wherein the means for receiving of the images comprises: means for receiving an image containing all of the calibration patterns from the front camera at a vehicle location outside of the u-shaped space when the vehicle is oriented with the front camera facing the calibration patterns; means for receiving an image containing an image containing all of the calibration patterns from the back camera at the vehicle location outside of the u-shaped space when the vehicle is oriented with the back camera facing the calibration patterns; when the vehicle location is within the u-shaped space and is oriented with the front camera facing the calibration patterns, the ECCS comprises: means for receiving an image containing the front calibration pattern from the front camera; means for receiving an image containing the right calibration pattern from the right camera; and means for receiving an image containing the left calibration pattern from the left camera; and when the vehicle location is within the u-shaped space and is oriented with the back camera facing the calibration patterns, the ECCS comprises: means for receiving an image containing the front calibration pattern from the back camera; means for receiving an image containing the right calibration pattern from the left camera; and means for receiving an image containing the left calibration pattern from the right camera.

In Example 56, the subject matter of Examples 46-55 includes, means for moving a vantage point about in 3D space; means for restitching together the four further images utilizing the stored ECPs and the moved vantage point into a further single displayable image; and means for displaying the further single displayable image on the display screen.

Example 57 is a system comprising means to perform any of the methods of Examples 12-19, 24, and 25.

Example 58 is a computer program product comprising one or more computer readable storage media comprising computer-executable instructions operable to, when executed by processing circuitry of a device, configure the device to perform any of the methods of Examples 12-19, 24, and 25.

Example 59 is an apparatus for an extrinsic camera calibration system (ECCS), the apparatus comprising: an extrinsic calibration processor to: receive, from a plurality of cameras mounted to a vehicle, an image comprising captured features from a calibration pattern; and determine, from one or more of the plurality of cameras, one or more extrinsic calibration parameters (ECPs) from one or more of the captured features, the one or more ECPs to map one or more coordinates of the one or more of the captured features to one or more camera coordinates.

In Example 60, the subject matter of Example 59 includes, wherein the plurality of cameras comprises at least four cameras mounted substantially on the front, back, left, and right sides of the vehicle.

In Example 61, the subject matter of Examples 59-60 includes, a memory to store the one or more determined extrinsic calibration parameters.

In Example 62, the subject matter of Examples 59-61 includes, wherein: the images from each camera are images of the calibration pattern that is a same calibration pattern; and the calibration pattern or the vehicle have been positioned relative to each other sequentially for each camera such that the calibration pattern is located in front of the respective camera prior to image capture by that respective camera.

In Example 63, the subject matter of Example 62 includes, wherein locations of the calibration pattern relative to the vehicle are at physically measured distances.

In Example 64, the subject matter of Examples 62-63 includes, wherein locations of the calibration pattern relative to the vehicle are determined by the processor from at least one of a known pattern size or relative feature locations.

In Example 65, the subject matter of Examples 62-64 includes, wherein the ECPs comprise projection matrices for each camera that map vehicle coordinates to camera coordinates determined from the imaged features for each camera, defined as:

$$P_{Vehicle\_CameraFront}, P_{Vehicle\_CameraRight},$$
$$P_{Vehicle\_CameraBack}, P_{Vehicle\_CameraLeft}.$$

In Example 66, the subject matter of Example 65 includes, wherein: the processor is further to determine the projection matrices for each camera that map vehicle coordinates to camera coordinates as:

$$P_{Vehicle\_CameraFront} = P_{Vehicle\_PatternFront} * P^{-1}_{CamFront\_PatternFront}$$

$$P_{Vehicle\_CameraRight} = P_{Vehicle\_PatternRight} * P^{-1}_{CamFront\_PatternRight}$$

$$P_{Vehicle\_CameraBack} = P_{Vehicle\_PatternBack} * P^{-1}_{CamFront\_PatternBack}$$

$$P_{Vehicle\_CameraLeft} = P_{Vehicle\_PatternLeft} * P^{-1}_{CamFront\_PatternLeft}$$

where:

$$P_{Vehicle\_PatternFront}, P_{Vehicle\_PatternRight},$$
$$P_{Vehicle\_PatternBack}, P_{Vehicle\_PatternLeft}$$

are projection matrices that map vehicle coordinates to calibration pattern coordinates; and $$P^{-1}_{CamFront\_PatternFront}, P^{-1}_{CamFront\_PatternRight},$$
$$P^{-1}_{CamFront\_PatternBack}, P^{-1}_{CamFront\_PatternLeft}$$

are inverse projection matrices that map camera coordinates to calibration pattern coordinates.

In Example 67, the subject matter of Examples 59-66 includes, wherein: the calibration pattern comprises a left calibration pattern, a right calibration pattern, a front calibration pattern, and a back calibration pattern, arranged to form a rectangular shaped space that is sized to contain the vehicle; and each calibration pattern is visible in two of the cameras when the vehicle is positioned within the rectangular shaped space.

In Example 68, the subject matter of Example 67 includes, wherein the ECPs comprise: projection matrices for each camera that map vehicle camera coordinates to calibration pattern coordinates determined from the imaged features for each camera at a given time (t), defined as:

$$P_{CamFront\_PatternFront}(t), P_{CamRight\_PatternRight}(t),$$
$$P_{CamBack\_PatternBack}(t), P_{CamLeft\_PatternLeft}(t); \text{ and}$$

rotation matrices that map camera rotation angles to vehicle rotation, defined as:

$$R_{Vehicle\_CamFront}, R_{Vehicle\_CamRight}, R_{Vehicle\_CamBack},$$
$$R_{Vehicle\_CamLeft}.$$

In Example 69, the subject matter of Example 68 includes, wherein: the processor is further to determine the projection matrices for each camera that map camera coordinates to pattern coordinates as:

$$P_{CamFront\_PatternFront}(t) = (P^{-1}_{World\_PatternFront} \cdot P_{World\_Vehicle}(t) \cdot P_{Vehicle\_CamFront}(t))^{-1}$$

$$P_{CamRight\_PatternRight}(t) = (P^{-1}_{World\_PatternRight} \cdot P_{World\_Vehicle}(t) \cdot P_{Vehicle\_CamRight}(t))^{-1}$$

$$P_{CamFront\_PatternBack}(t) = (P^{-1}_{World\_PatternBack} \cdot P_{World\_Vehicle}(t) \cdot P_{Vehicle\_CamBack}(t))^{-1}$$

$$P_{CamFront\_PatternLeft}(t) = (P^{-1}_{World\_PatternLeft} \cdot P_{World\_Vehicle}(t) \cdot P_{Vehicle\_CamLeft}(t))^{-1};$$

where:

$P_{Vehicle\_CamFront}(t), P_{Vehicle\_CamRight}(t), P_{Vehicle\_CamBack}(t), P_{Vehicle\_CamLeft}(t)$ are projection matrices that map vehicle coordinates to camera coordinates;

$P^{-1}_{World\_PatternFront}, P^{-1}_{World\_PatternRight}, P^{-1}_{World\_PatternBack}, P^{-1}_{World\_PatternLeft}$ are inverse projection matrices that map pattern coordinates to world coordinates; and $P_{World\_Vehicle}(t)$ is a projection matrix that maps vehicle coordinates to world coordinates.

In Example 70, the subject matter of Example 69 includes, wherein the processor is further to determine $P_{World\_Vehicle}(t)$ by applying:

$$P_{World\_Vehicle}(t) = \begin{bmatrix} \cos\varphi & -\sin\varphi & 0 & t_x \\ \sin\varphi & \cos\varphi & 0 & t_y \\ 0 & 0 & 1 & 0 \\ 0 & 0 & 0 & 1 \end{bmatrix}$$

where:

$\varphi$ is a rotation angle between the vehicle and the world coordinates; and $t_x$ and $t_y$ represent the vehicle translation in the x and y directions on the ground plane.

In Example 71, the subject matter of Examples 59-70 includes, wherein: the calibration pattern comprises a left calibration pattern, a right calibration pattern, and a front calibration pattern, arranged to form a u-shaped space that is sized to contain the vehicle; all calibration patterns are visible to the front camera at a vehicle location outside of the u-shaped space when the vehicle is oriented with the front camera facing the calibration patterns; all calibration patterns are visible to the back camera at the vehicle location outside of the u-shaped space when the vehicle is oriented with the back camera facing the calibration patterns; when the vehicle location is within the u-shaped space and is oriented with the front camera facing the calibration patterns: the front calibration pattern is visible to the front camera; the right calibration pattern is visible to the right camera; and the left calibration pattern is visible to the left camera; and when the vehicle location is within the u-shaped space and is oriented with the back camera facing the calibration patterns: the front calibration pattern is visible to the back camera; the right calibration pattern is visible to the left camera; and the left calibration pattern is visible to the right camera.

Example 72 is an extrinsic camera calibration system (ECCS) comprising: a surround view system (SVS) interface connecting the ECCS to the SVS, the SVS comprising: four cameras mounted to front, back, left, and right sides of a vehicle respectively; and at least one calibration pattern that comprises a set of features; and an extrinsic calibration processor; wherein the processor is to: receive, from each camera via the network interface, an image comprising captured features from the calibration pattern; and determine extrinsic calibration parameters (ECPs) for each camera that map coordinates of the features to camera coordinates, the ECPs being determined from the image features.

In Example 73, the subject matter of Example 72 includes, wherein: the images from each camera are images of the calibration pattern that is a same calibration pattern; and the calibration pattern or the vehicle have been positioned relative to each other sequentially for each camera such that the calibration pattern is located in front of the respective camera prior to image capture by that respective camera.

Example 74 is at least one machine-readable medium including instructions, which when executed by a machine, cause the machine to perform operations of any of the operations of Examples 1-73.

Example 75 is an apparatus comprising means for performing any of the operations of Examples 1-73.

Example 76 is a system to perform any of the operations of Examples 1-73.

Example 77 is a method to perform any of the operations of Examples 1-73.

What is claimed is:

1. An apparatus for an extrinsic camera calibration system (ECCS), the apparatus comprising:
   an extrinsic calibration processor to:
   receive, from a plurality of cameras mounted to a vehicle, an image comprising captured features from a calibration pattern, wherein the calibration pattern is in an unknown location and orientation with respect to the vehicle when the image is captured; and
   determine, from one or more of the plurality of cameras, one or more extrinsic calibration parameters (ECPs) from one or more of the captured features, the one or more ECPs to map one or more coordinates of the one or more of the captured features to one or more camera coordinates, wherein the one or more captured features are in unknown orientations relative to each other before the one or more ECPs are determined.

2. The apparatus of claim 1, wherein the plurality of cameras comprises at least four cameras mounted on the front, back, left, and right sides of the vehicle.

3. The apparatus of claim 1, further comprising a memory to store the one or more determined extrinsic calibration parameters.

4. The apparatus of claim 1, wherein:
   the images from each camera are images of the calibration pattern that is a same calibration pattern; and
   the calibration pattern is moved such that the calibration pattern is positioned relative to each of the plurality of cameras sequentially such that the calibration pattern is located in front of the respective camera prior to image capture by that respective camera.

5. The apparatus of claim 4, wherein locations of the calibration pattern relative to the vehicle are at physically measured distances.

6. The apparatus of claim 4, wherein locations of the calibration pattern relative to the vehicle are determined by the processor from at least one of a known pattern size or relative feature locations.

7. The apparatus of claim 4, wherein the ECPs comprise projection matrices for each camera that map vehicle coordinates to camera coordinates determined from the imaged features for each camera, defined as:

$P_{Vehicle\_CameraFront}, P_{Vehicle\_CameraRight}, P_{Vehicle\_CameraBack}, P_{Vehicle\_CameraLeft}.$ 8. The apparatus of claim 7, wherein:
   the processor is further to determine the projection matrices for each camera that map vehicle coordinates to camera coordinates as:

$$P_{Vehicle\_CameraFront} = P_{Vehicle\_PatternFront} * P^{-1}_{CamFront\_PatternFront}$$

$$P_{Vehicle\_CameraRight} = P_{Vehicle\_PatternRight} * P^{-1}_{CamFront\_PatternRight}$$

$$P_{Vehicle\_CameraBack} = P_{Vehicle\_PatternBack} * P^{-1}_{CamFront\_PatternBack}$$

$$P_{Vehicle\_CameraLeft} = P_{Vehicle\_PatternLeft} * P^{-1}_{CamFront\_PatternLeft}$$

where:

$P_{Vehicle\_PatternFront}, P_{Vehicle\_PatternRight},$
$P_{Vehicle\_PatternBack}, P_{Vehicle\_PatternLeft},$ are projection matrices that map vehicle coordinates to calibration pattern coordinates; and $P^{-1}_{CamFront\_PatternFront}, P^{-1}_{CamFront\_PatternRight},$
$P^{-1}_{CamFront\_PatternBack}, P^{-1}_{CamFront\_PatternLeft}$ are inverse projection matrices that map camera coordinates to calibration pattern coordinates.

9. The apparatus of claim 1, wherein:
the calibration pattern comprises a left calibration pattern, a right calibration pattern, a front calibration pattern, and a back calibration pattern, arranged to form a rectangular shaped space that is sized to contain the vehicle; and
each calibration pattern is visible in two of the cameras when the vehicle is positioned within the rectangular shaped space,
wherein to determine the one or more ECPs, the extrinsic calibration processor is to determine the one or more ECPs without knowing positions of the features relative to the vehicle.

10. The apparatus of claim 9, wherein the ECPs comprise:
projection matrices for each camera that map vehicle camera coordinates to calibration pattern coordinates determined from the imaged features for each camera at a given time (t), defined as:

$P_{CamFront\_PatternFront}(t), P_{CamRight\_PatternRight}(t),$
$P_{CamBack\_PatternBack}(t), P_{CamLeft\_PatternLeft}(t);$ and rotation matrices that map camera rotation angles to vehicle rotation, defined as:

$R_{Vehicle\_CamFront}, R_{Vehicle\_CamRight}, R_{Vehicle\_CamBack},$
$R_{Vehicle\_CamLeft}.$ 11. The apparatus of claim 10, wherein:
the processor is further to determine the projection matrices for each camera that map camera coordinates to pattern coordinates as:

$$P_{CamFront\_PatternFront}(t) = (P^{-1}_{World\_PatternFront} \cdot P_{World\_Vehicle}(t) \cdot P_{Vehicle\_CamFront}(t))^{-1}$$

$$P_{CamRight\_PatternRight}(t) = (P^{-1}_{World\_PatternRight} \cdot P_{World\_Vehicle}(t) \cdot P_{Vehicle\_CamRight}(t))^{-1}$$

$$P_{CamFront\_PatternBack}(t) = (P^{-1}_{World\_PatternBack} \cdot P_{World\_Vehicle}(t) \cdot P_{Vehicle\_CamBack}(t))^{-1}$$

$$P_{CamFront\_PatternLeft}(t) = (P^{-1}_{World\_PatternLeft} \cdot P_{World\_Vehicle}(t) \cdot P_{Vehicle\_CamLeft}(t))^{-1};$$

where:

$P_{Vehicle\_CamFront}(t), P_{Vehicle\_CamRight}(t), P_{Vehicle\_CamBack}(t), P_{Vehicle\_CamLeft}(t)$ are projection matrices that map vehicle coordinates to camera coordinates;

$P^{-1}_{World\_PatternFront}, P^{-1}_{World\_PatternRight},$
$P^{-1}_{World\_PatternBack}, P^{-1}_{World\_PatternLeft}$ are inverse projection matrices that map pattern coordinates to world coordinates; and $P_{World\_Vehicle}(t)$ is a projection matrix that maps vehicle coordinates to world coordinates.

12. The apparatus of claim 11, wherein the processor is further to determine $P_{World\_Vehicle}(t)$ by applying:

$$P_{World\_Vehicle}(t) = \begin{bmatrix} \cos\varphi & -\sin\varphi & 0 & t_x \\ \sin\varphi & \cos\varphi & 0 & t_y \\ 0 & 0 & 1 & 0 \\ 0 & 0 & 0 & 1 \end{bmatrix}$$

where:
$\varphi$ is a rotation angle between the vehicle and the world coordinates; and
$t_x$ and $t_y$ represent the vehicle translation in the x and y directions on the ground plane.

13. The apparatus of claim 1, wherein:
the calibration pattern comprises a left calibration pattern, a right calibration pattern, and a front calibration pattern, arranged to form a u-shaped space that is sized to contain the vehicle;
all calibration patterns are visible to the front camera at a vehicle location outside of the u-shaped space when the vehicle is oriented with the front camera facing the calibration patterns;
all calibration patterns are visible to the back camera at the vehicle location outside of the u-shaped space when the vehicle is oriented with the back camera facing the calibration patterns;
when the vehicle location is within the u-shaped space and is oriented with the front camera facing the calibration patterns:
the front calibration pattern is visible to the front camera;
the right calibration pattern is visible to the right camera; and
the left calibration pattern is visible to the left camera; and
when the vehicle location is within the u-shaped space and is oriented with the back camera facing the calibration patterns:
the front calibration pattern is visible to the back camera;
the right calibration pattern is visible to the left camera; and the left calibration pattern is visible to the right camera,
wherein the one or more ECPs are determined by the extrinsic calibration processor using estimated relative feature orientation, the relative feature orientation unknown before estimation.

14. A method performed by an extrinsic calibration system (ECCS) processor comprising:
receiving images via a network interface from a surround view system (SVS), the SVS comprising four cameras mounted to front, back, left, and right sides of a vehicle respectively that are front, back, left, and right cameras, wherein each captured image comprises captured features from a calibration pattern located in front, of each of the cameras, and wherein the calibration pattern is in an unknown location and orientation with respect to the vehicle when the image is captured;

determining extrinsic calibration parameters (ECPs) for each camera from the captured features that map coordinates of the captured features to camera coordinates and that are configured for subsequent operation of the cameras in capturing and displaying subsequent images, wherein the one or more captured features are in unknown orientations relative to each other before the one or more ECPs are determined; and storing, in a memory of the SVS, the ECPs that are accessible by the SVS during the subsequent operation.

15. The method of claim 14, further comprising, in a subsequent operation mode:
receiving further images via the network interface from each of the four cameras at a point in time;
stitching together the four further images utilizing the stored ECPs into a single displayable image; and
displaying the single displayable image on a display screen.

16. The method of claim 14, further comprising:
determining locations of the calibration pattern relative to the vehicle from at least one of a known pattern size or relative feature locations that are utilized in determining the ECPs;
wherein the receiving of the images comprises:
receiving an image from the front camera when the calibration pattern is moved in front of the front camera;
receiving an image from the right camera when the calibration pattern is moved in front of the right camera;
receiving an image from the left camera when the calibration pattern is moved in front of the left camera; and
receiving an image from the back camera when the calibration pattern is moved in front of the back camera.

17. The method of claim 14, wherein:
the calibration pattern comprises a left calibration pattern, a right calibration pattern, a front calibration pattern, and a back calibration pattern, arranged to form a rectangular shaped space that is sized to contain the vehicle; and
each calibration pattern is visible in two of the cameras when the vehicle is positioned with the rectangular shaped space.

18. The method of claim 17, further comprising:
determining projection matrices as a part of the ECPs for each camera that map vehicle camera coordinates to calibration pattern coordinates determined from the imaged features for each camera taken at a given time (t), defined as:

$P_{CamFront\_PatternFront}(t), P_{CamRight\_PatternRight}(t),$
$P_{CamBack\_PatternBack}(t), P_{CamLeft\_PatternLeft}(t);$ wherein the projection matrices are determined by:

$P_{CamFront\_PatternFront}(t) = (P^{-1}_{World\_PatternFront} \cdot P_{World\_Vehicle}(t) \cdot P_{Vehicle\_CamFront}(t))^{-1}$ $P_{CamRight\_PatternRight}(t) = (P^{-1}_{World\_PatternRight} \cdot P_{World\_Vehicle}(t) \cdot P_{Vehicle\_CamRight}(t))^{-1}$ $P_{CamBack\_PatternBack}(t) = (P^{-1}_{World\_PatternBack} \cdot P_{World\_Vehicle}(t) \cdot P_{Vehicle\_CamBack}(t))^{-1}$ $P_{CamLeft\_PatternLeft}(t) = (P^{-1}_{World\_PatternLeft} \cdot P_{World\_Vehicle}(t) \cdot P_{Vehicle\_CamLeft}(t))^{-1};$ where:

$P_{Vehicle\_CamFront}(t), P_{Vehicle\_CamRight}(t), P_{Vehicle\_CamBack}(t), P_{Vehicle\_CamLeft}(t)$ are projection matrices that map vehicle coordinates to camera coordinates;

$P^{-1}_{World\_PatternFront}, P^{-1}_{World\_PatternRight},$
$P^{-1}_{World\_PatternBack}, P^{-1}_{World\_PatternLeft}$ are inverse projection matrices that map pattern coordinates to world coordinates; and $P_{World\_Vehicle}(t)$ is a projection matrix that maps vehicle coordinates to world coordinates and is determined by $$P_{World\_Vehicle}(t) = \begin{bmatrix} \cos\varphi & -\sin\varphi & 0 & t_x \\ \sin\varphi & \cos\varphi & 0 & t_y \\ 0 & 0 & 1 & 0 \\ 0 & 0 & 0 & 1 \end{bmatrix}$$

where:
$\varphi$ is a rotation angle between the vehicle and the world coordinates; and
$t_x$ and $t_y$ represent the vehicle translation in the x and y directions on the ground plane; and
determining rotation matrices that amp camera rotation angles to vehicle rotation, defined as:

$R_{Vehicle\_CamFront}, R_{Vehicle\_CamRight}, R_{Vehicle\_CamBack}, R_{Vehicle\_CamLeft}.$ 19. The method of claim 14, wherein:
the calibration pattern comprises a left calibration pattern, a right calibration pattern, and a front calibration pattern, arranged to form a u-shaped space that is sized to contain the vehicle;
wherein the receiving of the images comprises:
receiving an image containing all of the calibration patterns from the front camera at a vehicle location outside of the u-shaped space when the vehicle is oriented with the front camera facing the calibration patterns;
receiving an image containing all of the calibration patterns from the back camera at the vehicle location outside of the u-shaped space when the vehicle is oriented with the back camera facing the calibration patterns;
when the vehicle location is within the u-shaped space and is oriented with the front camera facing the calibration patterns:
receiving an image containing the front calibration pattern from the front camera;
receiving an image containing the right calibration pattern from the right camera; and
receiving an image containing the left calibration pattern from the left camera; and
when the vehicle location is within the u-shaped space and is oriented with the back camera facing the calibration patterns:
receiving an image containing the front calibration pattern from the back camera;
receiving an image containing the right calibration pattern from the left camera; and
receiving an image containing the left calibration pattern from the right camera,
wherein the one or more ECPs are determined by the extrinsic calibration processor using estimated relative feature orientation, the relative feature orientation unknown before estimation.

20. At least one non-transitory machine-readable medium including instructions, which when executed by a processor of an extrinsic camera calibration system (ECCS), cause the processor to:
receive images via a network interface from a surround view system (SVS) comprising four cameras mounted to front, back, left, and right sides of a vehicle respectively that are front, back, left, and right cameras, wherein each captured image comprises captured features from a calibration pattern placed in front of each of the cameras, wherein the calibration pattern is in an unknown location and orientation with respect to the vehicle when the image is captured;
determine extrinsic calibration parameters (ECPs) for each camera from the captured features that map coordinates of the captured features to camera coordinates and that are configured for subsequent operation of the cameras in capturing and displaying subsequent images, wherein the one or more captured features are in unknown orientations relative to each other before the one or more ECPs are determined; and
store, in a memory of the SVS, the ECPs that are accessible by the SVS during the subsequent operation.

21. The medium of claim 20, wherein the instructions further cause the processor to:
determine locations of the calibration pattern relative to the vehicle from at least one of a known pattern size or relative feature locations;
wherein the receipt of the images comprises having the processor:
receive an image from the front camera when the calibration pattern is moved in front of the front camera;
receive an image from the right camera when the calibration pattern is moved in front of the right camera;
receive an image from the left camera when the calibration pattern is moved in front of the left camera; and
receive an image from the back camera when the calibration pattern is moved in front of the back camera.

22. The medium of claim 20, wherein:
the calibration pattern comprises a left calibration pattern, a right calibration pattern, a front calibration pattern, and a back calibration pattern, arranged to form a rectangular shaped space that is sized to contain the vehicle; and
each calibration pattern is visible in two of the cameras when the vehicle is positioned with the rectangular shaped space.

23. The medium of claim 20, wherein:
the calibration pattern comprises a left calibration pattern, a right calibration pattern, and a front calibration pattern, arranged to form a u-shaped space that is sized to contain the vehicle;
wherein the receipt of the images comprises having the processor:
receive an image containing all of the calibration patterns from the front camera at a vehicle location outside of the u-shaped space when the vehicle is oriented with the front camera facing the calibration patterns;
receive an image containing all of the calibration patterns from the back camera at the vehicle location outside of the u-shaped space when the vehicle is oriented with the back camera facing the calibration patterns;
when the vehicle location is within the u-shaped space and is oriented with the front camera facing the calibration patterns:
receive an image containing the front calibration pattern from the front camera;
receive an image containing the right calibration pattern from the right camera; and
receive an image containing the left calibration pattern from the left camera; and
when the vehicle location is within the u-shaped space and is oriented with the back camera facing the calibration patterns:
receive an image containing the front calibration pattern from the back camera;
receive an image containing the right calibration pattern from the left camera; and
receive an image containing the left calibration pattern from the right camera,
wherein the one or more ECPs are determined by the extrinsic calibration processor using estimated relative feature orientation, the relative feature orientation unknown before estimation.

24. An extrinsic camera calibration system (ECCS) comprising:
a surround view system (SVS) interface connecting the ECCS to the SVS, the SVS comprising: four cameras mounted to front, back, left, and right sides of a vehicle respectively; and
at least one calibration pattern that comprises a set of features; and an extrinsic calibration processor;
wherein the processor is to: receive, from each camera via the network interface, an image comprising captured features from the calibration pattern, wherein the calibration pattern is in an unknown location and orientation with respect to the vehicle when the image is received; and determine extrinsic calibration parameters (ECPs) for each camera that map coordinates of the captured features to camera coordinates, the ECPs being determined from the captured features, wherein the one or more captured features are in unknown orientations relative to each other before the one or more ECPs are determined.

25. The ECCS of claim 24, wherein:
the images from each camera are images of the calibration pattern that is a same calibration pattern; and
the calibration pattern or the vehicle have been positioned relative to each other sequentially for each camera such that the calibration pattern is located in front of the respective camera prior to image capture by that respective camera.

* * * * *